US012560262B2

(12) United States Patent
Stern et al.

(10) Patent No.: US 12,560,262 B2
(45) Date of Patent: Feb. 24, 2026

(54) FITTING

(71) Applicant: Mueller International, LLC, Atlanta, GA (US)

(72) Inventors: Timothy Wayne Stern, Hixon, TN (US); David Latimore Hughes, Jr., Signal Mountain, TN (US); Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/796,843

(22) Filed: Aug. 7, 2024

(65) Prior Publication Data

US 2026/0043505 A1    Feb. 12, 2026

(51) Int. Cl.
*F16L 21/04* (2006.01)
*F16L 21/00* (2006.01)
*F16L 25/14* (2006.01)

(52) U.S. Cl.
CPC ............. *F16L 25/14* (2013.01); *F16L 21/007* (2013.01)

(58) Field of Classification Search
CPC ......... F16L 21/007; F16L 21/08; F16L 21/03; F16L 21/065; F16L 37/08; F16L 37/10; F16L 25/06; F16L 25/04; F16L 25/065; F16L 25/08; F16L 25/14
See application file for complete search history.

(56) References Cited

U.S. PATENT DOCUMENTS

| | | | | |
|---|---|---|---|---|
| 4,290,632 A | * | 9/1981 | Manchester, Jr. ....... | F16L 21/08 |
| | | | | 285/94 |
| 7,837,239 B2 | * | 11/2010 | Krausz .................. | F16L 21/065 |
| | | | | 285/373 |
| 8,894,100 B2 | | 11/2014 | Eaton et al. | |
| 9,534,714 B2 | | 1/2017 | Eaton et al. | |
| 9,915,385 B2 | | 3/2018 | Eaton et al. | |
| 2016/0153592 A1 | * | 6/2016 | Showkathali ........... | F16L 21/04 |
| | | | | 285/369 |

\* cited by examiner

*Primary Examiner* — Aaron M Dunwoody
(74) *Attorney, Agent, or Firm* — Taylor Duma LLP

(57) ABSTRACT

A gripping assembly for a pipe fitting includes a substantially annular ramp defining a ramp void therethrough, the substantially annular ramp further defining an angled ramp surface angled radially inward relative to the ramp void; and a annular grip ring defining a ring void therethrough, the substantially annular grip ring further defining an inward gripper surface and an angled ring surface, the angled ring surface extending radially inward relative to ring void and contacting and slidable along the angled ramp surface of the substantially annular ramp; wherein the ramp void and the ring void are configured to receive a pipe end of a pipe therethrough, the substantially annular ramp is configured to bias the substantially annular grip ring radially inward towards the pipe, and the inward gripper surface is configured to grip an outer pipe surface of the pipe.

21 Claims, 20 Drawing Sheets

FITTING

TECHNICAL FIELD

This disclosure relates to pipe fittings. More specifically, this disclosure relates to a pipe fitting configured to attach to piping components that, in some aspects, can define varying diameters.

BACKGROUND

A fluid piping system can comprise piping components (e.g., pipe segments, valves, etc.) that can be joined together with pipe fittings. In some aspects, the piping components can comprise varying outer diameters where the piping component is to be engaged with the pipe fitting. The outer diameters of piping components can vary, for example, based on size of the piping component and/or the material(s) of the piping component. Often, pipe fittings are not adjustable to accommodate varying outer diameters and/or can only accommodate a small range of varying outer diameters. In some aspects as well, traditional pipe fittings can require tightening fasteners on the fitting that can require high torque to sufficiently tighten the fasteners.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a gripping assembly for a pipe fitting comprising a substantially annular ramp defining a ramp void therethrough, the substantially annular ramp further defining an angled ramp surface angled radially inward relative to the ramp void; and a annular grip ring defining a ring void therethrough, the substantially annular grip ring further defining an inward gripper surface and an angled ring surface, the angled ring surface extending radially inward relative to ring void and contacting and slidable along the angled ramp surface of the substantially annular ramp; wherein the ramp void and the ring void are configured to receive a pipe end of a pipe therethrough, the substantially annular ramp is configured to bias the substantially annular grip ring radially inward towards the pipe, and the inward gripper surface is configured to grip an outer pipe surface of the pipe.

Also disclosed is a gripping assembly comprising an outer crown comprising a plurality of outer teeth; an inner crown comprising a plurality of inner teeth nested with the plurality of outer teeth; a ramp defining an angled ramp surface; and a grip ring defining an angled ring surface; wherein: the gripping assembly defines a gripping axis extending centrally through the outer crown, the inner crown, the ramp, and the grip ring; the outer crown is configured to rotate the outer teeth against the inner teeth to bias the inner crown axially against one of the ramp or the grip ring; and the angled ring surface of the grip ring is configured to slide along the angled ramp surface of the ramp to bias the grip ring radially inward relative to the gripping axis.

Also disclosed is a pipe fitting comprising a fitting body defining a first fitting end, a second fitting end opposite the first fitting end, and a fitting bore extending from the first fitting end to the second fitting end, the fitting bore defining a fitting axis; and a gripping assembly arranged at least partially within the fitting bore, the gripping assembly comprising: a ramp defining an angled ramp surface; and a grip ring defining an angled ring surface, wherein the angled ring surface of the grip ring is configured to slide along the angled ramp surface of the ramp to bias the grip ring radially inward relative to the fitting axis.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
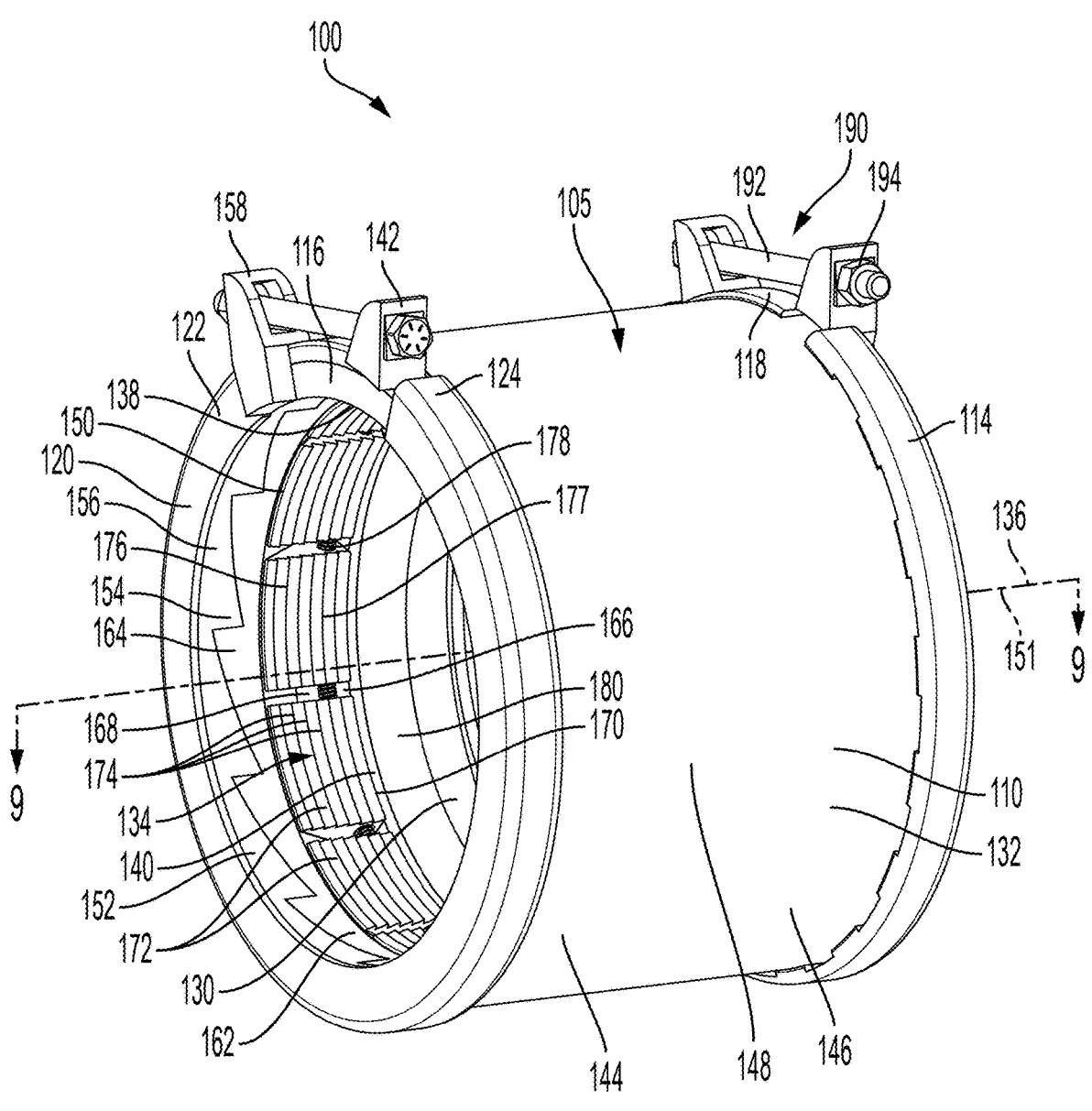
FIG. 1 is a perspective view of a pipe fitting, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pipe fitting and associated methods, systems, devices, and various apparatus. Example aspects of the pipe fitting can comprise a fitting body, a ramp, and a grip ring and can be wide range, such that the pipe fitting can accommodate and engage a wide range of pipe outer diameters. It would be understood by one of skill in the art that the pipe fitting is described in but a few exemplary embodiments among many. No particular terminology or description should be considered limiting on the disclosure or the scope of any claims issuing therefrom.

FIG. 1 is a perspective view of a pipe fitting 100, in accordance with an example aspect of the present disclosure. In example aspects, the pipe fitting 100 can be a pipe coupling 105, as shown. Example aspects of the pipe coupling 105 can couple together a pair of pipe segments, such as plain-end pipes, and can allow fluid to flow between the pipe segments. In other aspects, the pipe fitting 100 can be any other suitable fitting known in the art for coupling various piping components together, includes valves and other fittings, such as tees, elbows, caps, and the like, for example and without limitation. The pipe fitting 100 can comprise a fitting body 110, a first retention cap 112, and a second retention cap 114. Example aspects of the fitting body 110 can define a substantially tubular shape. The fitting body 110 can define a first fitting end 116 and a second fitting end 118 disposed opposite the first fitting end 116. The first retention cap 112 can be mounted to the fitting body 110 at the first fitting end 116, and the second retention cap 114 can be mounted to the fitting body 110 at the second fitting end 118. In the present aspect, each of the first retention cap 112 and the second retention cap 114 can be formed as a split ring 120 defining a free first ring end 122 and a free second ring end 124.

The fitting body 110 can define an inner body surface 130 and an outer body surface 132 opposite the inner body surface 130. The inner body surface 130 can define a fitting bore 134 extending through the fitting body 110 from the first fitting end 116 to the second fitting end 118. The fitting bore 134 can define a fitting axis 136 extending centrally therethrough. The fitting bore 134 can define a first bore opening 138 at the first fitting end 116 and a second bore opening 210 (shown in FIG. 2) at the second fitting end 118. A pipe end of a first pipe segment can be inserted into the fitting bore 134 through the first bore opening 138, and a pipe end of a second pipe segment can be inserted into the fitting bore 134 through the second bore opening 210. Example aspects of the fitting body 110 can define a first portion 144 extending from the first fitting end 116 generally to a midpoint 148 between the first fitting end 116 and the second fitting end 118. The fitting body 110 can further define a second portion 146 extending from the second fitting end 118 generally to the midpoint 148. A first gripping assembly 150 can be substantially disposed within the fitting bore 134 at the first portion 144, adjacent to the first fitting end 116, and a second gripping assembly 950 (shown in FIG. 9) can be substantially disposed within the fitting bore 134 at the second portion 146, adjacent to the second fitting end 118. The first retention cap 112 and the second retention cap 114 can retain the first gripping assembly 150 and the second gripping assembly 950, respectively, within the fitting bore 134.

A gripping axis 151 can extend centrally through the first gripping assembly 150 and the second gripping assembly 950. The gripping axis 151 can be substantially coaxial with the fitting axis 136. In the present aspect, each of the first gripping assembly 150 and the second gripping assembly 950 can comprise an outer crown 152, an inner crown 162, a ramp 166, and a grip ring 170. In some aspects, the outer crown 152, the inner crown 162, the ramp 166, and/or the grip ring 170 can comprise a substantially rigid material, such as a hard plastic or metal, for example and without limitation. Each of the first gripping assembly 150 and the second gripping assembly 950 can further comprise a gasket 180. In example aspects, the gasket 180 can comprise a flexible and resilient material, such as a rubber, for example and without limitation. Each of the outer crown 152, the inner crown 162, the ramp 166, the grip ring 170, and the gasket 180 can be substantially annular in the present aspect and can contact the inner body surface 130 of the fitting body 110. The outer crown 152 can be arranged adjacent to the first fitting end 116 of the fitting body 110, and the inner crown 162 can be arranged axially inward of the outer crown 152, such that the outer crown 152 can be positioned axially between the inner crown 162 and the first fitting end 116. The outer crown 152 can define a plurality of outer teeth 154 extending axially towards the inner crown 162, and the inner crown 162 can define a plurality of inner teeth 164 extending axially towards the outer crown 152. Each of the inner teeth 164 of the inner crown 162 can be configured to nest between an adjacent pair of the outer teeth 154 of the outer crown 152, as shown. In the present aspect, each of the outer teeth 154 and the inner teeth 164 can define a substantially triangular shape. More specifically, each of the outer teeth 154 and the inner teeth 164 can define the shape of a right triangle in some aspects, as described in further detail below.

In other aspects, however, the outer teeth 154 and/or the inner teeth 164 can define any other suitable shape.

The ramp 166 can be arranged axially inward of the inner crown 162, such that the inner crown 162 can be positioned axially between the ramp 166 and the outer crown 152. The ramp 166 can define an angled ramp surface 168. According to example aspects, at least a portion of the grip ring 170 can overlap at least a portion of the ramp 166. The grip ring 170 can further extend axially inward of the ramp 166. The angled ramp surface 168 of the ramp 166 can be angled towards the grip ring 170. The grip ring 170 of the present aspect can be sectioned into a plurality of gripper pads 172. The gripper pads 172 can be arranged circumferentially to define the annular grip ring 170. Each of the gripper pads 172 can define an angled ring surface 705 (shown in FIG. 7A) angled toward the ramp 166 and configured to confront and slide along the angled ramp surface 168 of the ramp 166. Each of the gripper pads 172 can be connected each adjacent gripper pad 172 by a gripper spring 178. The gripper springs 178 extending between adjacent gripper pads 172 can allow an inner diameter D (shown in FIG. 7A) of the grip ring 170 to contract when the grip ring 170 is biased radially inward by the ramp 166, as described in further detail below.

According to example aspects, the fitting body 110 can define one or more axial guide ribs 220 (shown in FIG. 2) extending radially inward from the inner body surface 130 at each of the first portion 144 and the second portion 146. Each of the axial guide ribs 220 can be elongated in the axial direction. In the present aspect, a first set 220a (shown in FIG. 2) of the axial guide ribs 220 can be spaced circumferentially about the inner body surface 130 at the first portion 144, and a second set 220b (shown in FIG. 2) of the axial guide ribs 220 can be spaced circumferentially about the inner body surface 130 at the second portion 146. The axial guide ribs 220 can engage each of the inner crown 162 and the ramp 166, and the inner crown 162 and the ramp 166 can be configured slide axially along the axial guide ribs 220, as described in further detail below. Additionally, the fitting body 110 can define a substantially annular ring shoulder 140 extending radially inward from the inner body surface 130 at each of the first portion 144 and the second portion 146. The gasket 180 can be arranged axially inward of the grip ring 170, with the ring shoulder 140 positioned axially between the gasket 180 and the grip ring 170. The ring shoulder 140 can prohibit the grip ring 170 from sliding axially inward toward the gasket 180 as the grip ring 170 is biased radially inward by the ramp 166. However, in other aspects, the annular ring shoulder 140 may not be present and each gasket 180 can engage directly with each respective gripping assembly 150,950, such as with the grip ring 170 of each gripping assembly 150,950.

Example aspects of the fitting body 110 can further define a body fastener catch 142 extending radially outward from the outer body surface 132 at each of the first fitting end 116 and the second fitting end 118. Moreover, the outer crown 152 can define an annular outer crown body 156 and a crown fastener catch 158 extending radially outward therefrom. The annular outer crown body 156 of the outer crown 152 can be arranged within the fitting bore 134 and the outer teeth 154 can extend axially inward therefrom. The crown fastener catch 158 can extend out of the fitting bore 134 at the corresponding first fitting end 116 or second fitting end 118, and can be substantially aligned with the corresponding body fastener catch 142. A tightening fastener 190 can engage each corresponding pair of the body fastener catch 142 and the crown fastener catch 158. The tightening fastener 190 can comprise, for example and without limitation, a fastener bolt 192 and a fastener nut 194 threadedly mounted to the fastener bolt 192. In other aspects, the tightening fastener 190 can be any other suitable fastener known in the art.

As the tightening fastener 190 is tightened, the crown fastener catch 158 can be drawn towards the body fastener catch 142, which in turn can rotate the annular outer crown body 156 of the outer crown 152 within the fitting bore 134. As previously described, the outer teeth 154 of the outer crown 152 can be interlocked within the inner teeth 164 of the inner crown 162, and thus, the outer teeth 154 can be rotated against the inner teeth 164. The inner crown 162 can be rotationally fixed due the engagement of the axial guide ribs 220 with the inner crown 162. The rotation of the outer crown 152 against the inner crown 162 can therefore slide the inner crown 162 axially inward along the axial guide ribs 220. As the inner crown 162 slides axially inward, the inner crown 162 can press against the ramp 166 in the axial direction. The axial guide ribs 220 can further be engaged with the ramp 166, and the ramp 166 can slide axially inwards along the axial guide ribs 220 simultaneously with the inner crown 162.

As previously mentioned, the angled ramp surface 168 of the ramp 166 can confront the angled ring surface 705 of each of the gripper pads 172. Each of the gripper pads 172 can further confront the ring shoulder 140 of the fitting body 110, which can prevent the grip ring 170 from sliding axially inward towards the gasket 180. As the ramp 166 slides axially inward along the axial guide ribs 220, the angled ramp surface 168 thereof can slide against the angled ring surface 705 of each gripper pad 172, which, along with the confrontation of the gripper pads 172 with the ring shoulder 140, can bias each of the gripper pads 172 radially inward. As the gripper pads 172 are biased radially inward, each of the gripper springs 178 can be compressed between the adjacent corresponding gripper pads 172 to allow the inner diameter D of the grip ring 170 to decrease.

As shown, each of the gripper pads 172 can define a plurality of gripping ridges 174 extending radially into the fitting bore 134. The gripping ridges 174 can be formed by an inward gripper surface 176 of each gripper pad 172. In some aspects, each of the gripping ridges 174 can define a substantially triangular cross-section, as seen in FIG. 7B. In other aspects, the gripping ridges 174 can define any other suitable cross-sectional shape. When the gripper pads 172 are biased radially inward upon the tightening of the tightening fasteners 190, a radially inward edge 177 of each of the gripping ridges 174 can engage and grip an outer pipe surface of the corresponding pipe segment to retain the pipe segment within the fitting bore 134.

The gripping assemblies 150,950 thereby can be configured, in some aspects, to grip pipe segments having varying outer diameters. For example, for pipe segments with smaller diameters, further rotation of the outer crown 152 can push the inner crown 162 further axially inwards, further pushing the grip ring 170 further radially inwards until the grip ring 170 engages the outer pipe surface. For pipe segments having larger diameters, less rotation of the outer crown 152 is needed. Thus, each gripping assembly 150,950 can engage a wide range of pipe segments with varying outer diameters.

Further, actuation of the gripping assemblies 150,950 can require less torque on the fasteners 190, the translation or rotation of the fastener 190, such as the bolt 192 and the nut 194, to rotation of the outer crown 152 that engages the inner teeth 154 with the outer teeth 164 of the inner crown 162 in a ramped engagement that thereby causes axial movement of the inner crown 162 and radial movement of the grip ring 170 thereby reduces the amount of torque needed on fasteners 190 to engage the gripping assemblies 150,950. For larger pipe fittings 100 designed for larger diameters of pipe segments, the reduction of torque is especially high.

Figure 2:
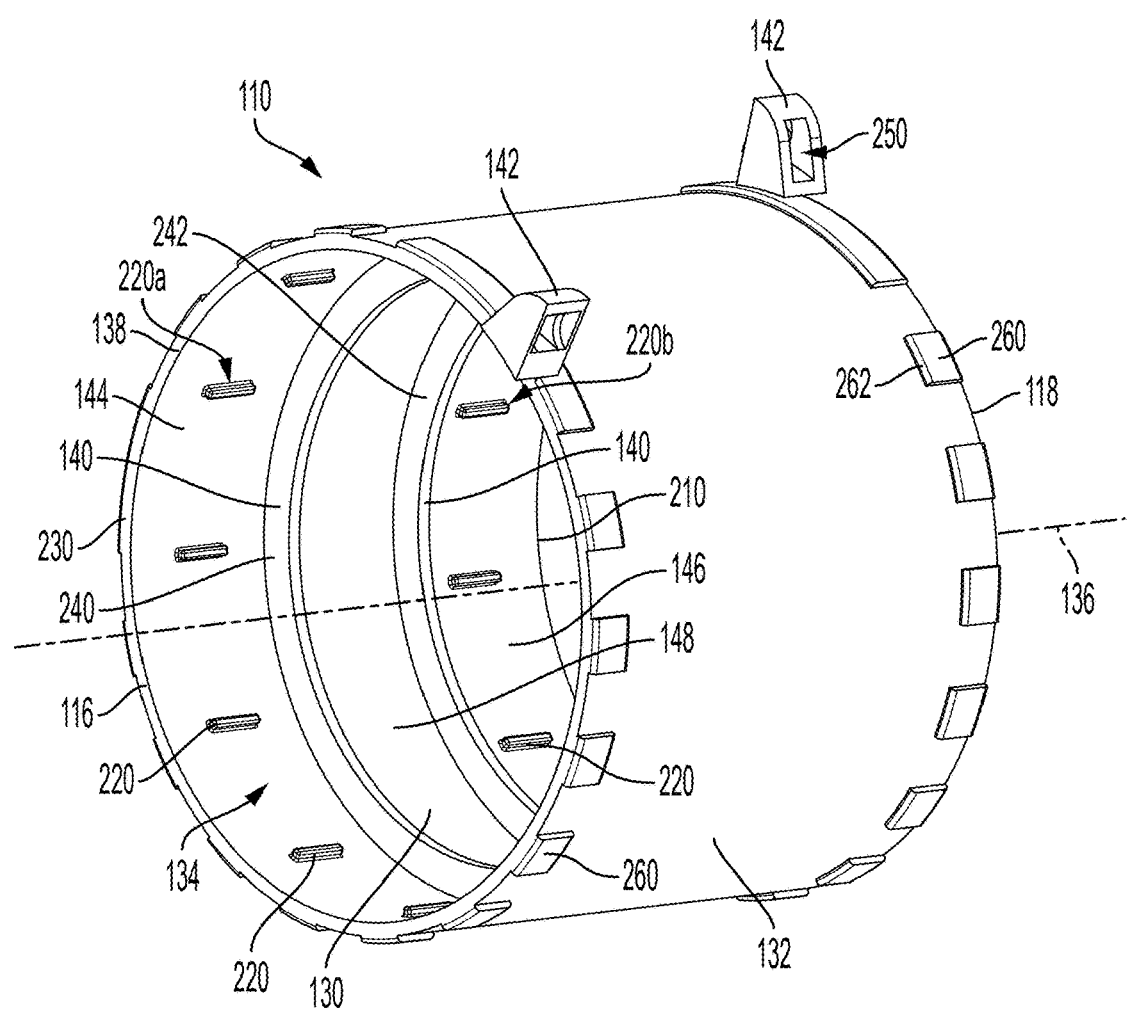
FIG. 2 is a perspective view of a fitting body of the pipe fitting of FIG. 1.

FIG. 2 illustrates a perspective view of the fitting body 110. As shown, the fitting body 110 can form the substantially tubular shape and can define the first fitting end 116 and the second fitting end 118 opposite the first fitting end 116. The fitting body 110 can further define the inner body surface 130 and the outer body surface 132. A first radial fitting end wall 230 can extend between the outer body surface 132 and the inner body surface 130 at the first fitting end 116, and a second radial fitting end wall 930 (shown in FIG. 9) can extend between the outer body surface 132 and the inner body surface 130 at the second fitting end 118. The inner body surface 130 can define the fitting bore 134 extending through the fitting body 110 from the first fitting end 116 to the second fitting end 118, and the fitting axis 136 can extend centrally through the fitting bore 134. The first bore opening 138 can be formed at the first fitting end 116 and the second bore opening 210 can be formed at the second fitting end 118. The first portion 144 of the fitting body 110 can extend from the first fitting end 116 to the second portion 146 of the fitting body 110, and the second portion 146 can extend from the first portion 144 to the second fitting end 118.

The fitting body 110 can define the plurality of axial guide ribs 220 extending radially inward from the inner body surface 130 at each of the first portion 144 and the second portion 146. Each of the axial guide ribs 220 can be elongated in the axial direction, as shown. The first set 220a of the axial guide ribs 220 can be spaced circumferentially about the inner body surface 130 proximate to the first fitting end 116, and the second set 220b of the axial guide ribs 220 can be spaced circumferentially about the inner body surface 130 proximate to the second fitting end 118. The fitting body 110 can further define the ring shoulder 140 extending radially inward from the inner body surface 130 at each of the first portion 144 and the second portion 146. Each ring shoulder 140 can be arranged axially inward of the corresponding first or second set 220a,b of the axial guide ribs 220. Each ring shoulder 140 can define a substantially planar axially outer shoulder surface 240 facing the corresponding grip ring 170 (shown in FIG. 1) and an opposite substantially planar axially inner shoulder surface 242 facing the corresponding gasket 180 (shown in FIG. 1).

The fitting body 110 can also define the body fastener catches 142 extending radially outward from the outer body surface 132 at the corresponding first fitting end 116 and the second fitting end 118. Each of the body fastener catches 142 can define a body fastener opening 250 configured to receive the tightening fastener 190 (shown in FIG. 1) therethrough. Additionally, the outer body surface 132 of the fitting body 110 can define a plurality of raised engagement projections 260 spaced circumferentially about each of the first fitting end 116 and the second fitting end 118. Each of the raised engagement projections 260 can define an inward catch surface 262. The first retention cap 112 (shown in FIG. 1) can be configured to hook onto the inward catch surfaces 262 of the raised engagement projections 260 formed at the first fitting end 116, and the second retention cap 114 (shown in FIG. 1) can be configured to hook onto the inward catch surfaces 262 of the raised engagement projections 260 formed at the second fitting end 118.

Figure 3:
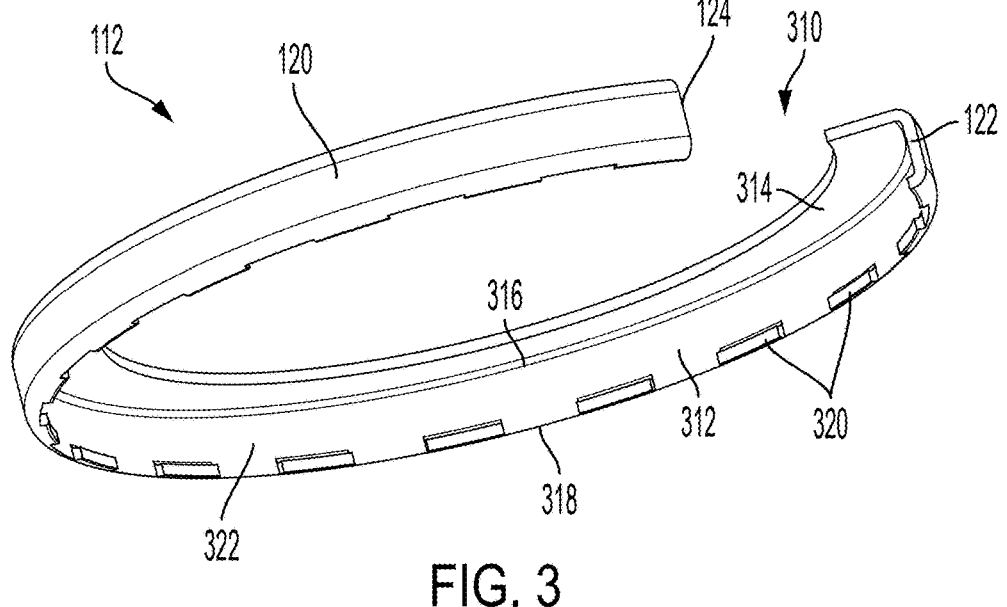
FIG. 3 is a perspective view of a retention cap of the pipe fitting of FIG. 1.

FIG. 3 illustrates an example aspect of the first retention cap 112, which can be substantially the same as the second retention cap 114 (shown in FIG. 1). The first retention cap 112 can be formed as the split ring 120 defining the free first ring end 122 and the confronting free second ring end 124. A cap gap 310 can be defined between the free first ring end 122 and the free second ring end 124, as shown. Each of the body fastener catch 142 (shown in FIG. 1) and the crown fastener catch 158 (shown in FIG. 1) can be arranged within the cap gap 310, as shown in FIG. 1. In example aspects, the first retention cap 112 can be substantially arcuate in shape. In the present aspect, the first retention cap 112 can define a major arc (e.g., greater than 180°).

The first retention cap 112 can comprise a substantially annular circumferential cap wall 312 configured to extend circumferentially about the outer body surface 132 (shown in FIG. 1) of the fitting body 110 (shown in FIG. 1) proximate to the first fitting end 116 (shown in FIG. 1). Similarly, the circumferential cap wall 312 of the second retention cap 114 can extend circumferentially about the outer body surface 132 of the fitting body 110 proximate to the second fitting end 118 (shown in FIG. 2). The first retention cap 112 can further define a radial cap wall 314 extending radially inward from a first axial cap side 316 of the circumferential cap wall 312 to substantially cover the first radial fitting end wall 230 (shown in FIG. 2) at the first fitting end 116 of the fitting body 110. Similarly, the radial cap wall 314 of the second retention cap 114 can extend radially inward from the first axial cap side 316 of the corresponding circumferential cap wall 312 to substantially cover the second radial fitting end wall 930 (shown in FIG. 9) of the second fitting end 118 of the fitting body 110.

The circumferential cap wall 312 can define a second axial cap side 318 opposite the first axial cap side 316. According to example aspects, one or more engagement tabs 320 can extend radially inward from an inner wall surface 322 of the circumferential cap wall 312 at the second axial cap side 318. In the present aspect, the first retention cap 112 can comprise a plurality of the engagement tabs 320 spaced circumferentially about the inner wall surface 322. Each of the engagement tabs 320 can be configured to hook onto the inward catch surface 262 (shown in FIG. 2) of a corresponding one of the raised engagement projections 260 (shown in FIG. 2) formed proximate to the first fitting end 116 to retain the first retention cap 112 on the fitting body 110. The second retention cap 114 can be retained on the fitting body 110 in the same manner.

In other aspects, the first retention cap 112 and/or the second retention cap 114 can be formed integrally and/or monolithically (i.e., formed a singular component that constitutes a single material without joints or seams) with the fitting body 110, or could each be a separate component, such as a plate in the shape of a washer, that is welded or otherwise fixedly and/or permanently attached to the first fitting end 116 and/or the second fitting end 118. In some aspects, the first retention cap 112 could be monolithic with the fitting body 110 and the second retention cap 114 could be a separate component such as the first retention cap 112 shown in FIG. 3 or a welded plate or other component such that the gripping assemblies 150,950 and gaskets 180 could be loaded from the second fitting end 118 prior to attachment of the second retention cap 114. In other aspects, both the first retention cap 116 and the second retention cap 118 can be monolithic or otherwise fixedly and/or permanently attached to the first fitting end 116 and the second fitting end 118, respectively, and the fitting body 110 can define a seam proximate to the midpoint 148 splitting the fitting body 110 into two halve that could be attached to each other, such as with a flanged connection, after insertion of the gripping assemblies 150,950 and gaskets 180 into the fitting body 110. Such a configuration would also allow a single gripping assembly 150,950 to be installed on a preexisting piping component, such as a valve, that already comprises a flange or other standard connection, by attaching a half portion of a pipe fitting 100 such as shown in FIG. 1 to the flange or other standard connection, thereby allowing a retrofit option for existing valves and other piping components.

Figure 4:
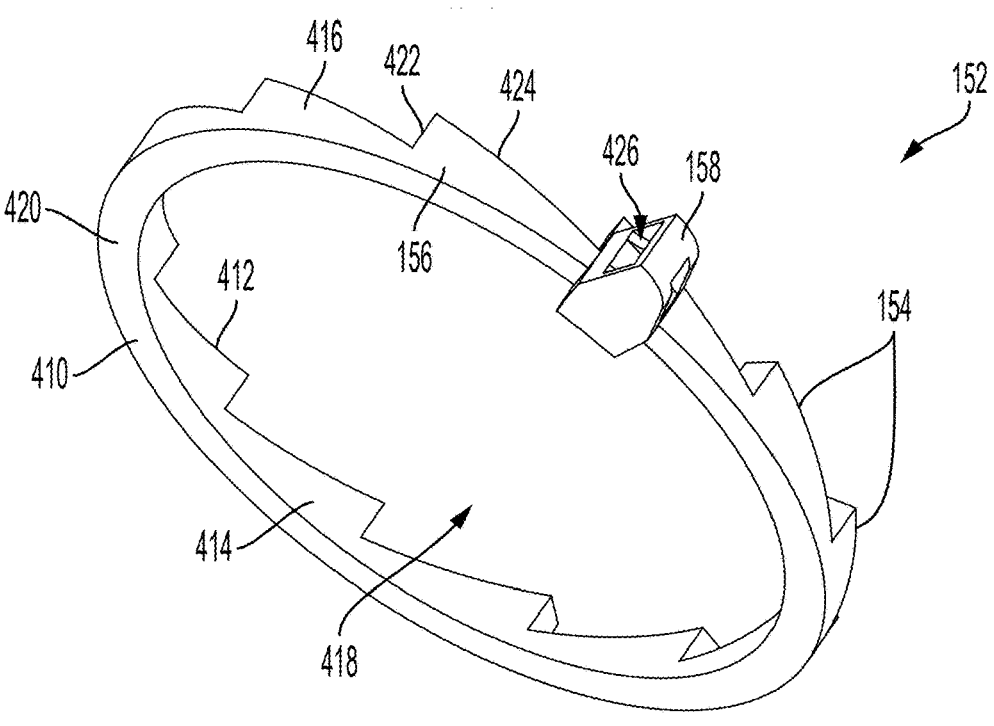
FIG. 4 is a perspective view of an outer crown of the pipe fitting of FIG. 1.

FIG. 4 illustrates a perspective view of the outer crown 152. As shown, the outer crown 152 can comprise the annular outer crown body 156. The outer crown body 156 can define a first outer crown side 410, an opposite second outer crown side 412, an inward outer crown surface 414, and an opposite outward outer crown surface 416. The inward outer crown surface 414 can define an outer crown void 418 extending centrally through the outer crown 152 from the first outer crown side 410 to the second outer crown side 412. The outer crown 152 can also comprise the crown fastener catch 158 extending radially outward from the outward outer crown surface 416. The crown fastener catch 158 can define a crown fastener opening 426 configured to receive the tightening fastener 190 (shown in FIG. 1) therethrough. In example aspects, the crown fastener catch 158 can be arranged at or proximate to the first outer crown side 410. Additionally, the first outer crown side 410 can be configured to confront, and some instances can abut, the radial cap wall 314 (shown in FIG. 3) of the corresponding first retention cap 112 or second retention cap 114 (both shown in FIG. 1). The first outer crown side 410 can define a substantially planar outer crown side surface 420 in some aspects.

The outer crown 152 can further comprise the plurality of outer teeth 154 extending axially from the second outer crown side 412 of the outer crown body 156. Each of the outer teeth 154 can define the shape of a substantially right triangle in the present aspect. That is, each of the outer teeth 154 can define a leg side 422 extending axially outward from the outer crown body 156, substantially perpendicular thereto, and a hypotenuse side 424 extending between the leg side 422 and the outer crown body 156. In the present aspect, a length of the hypotenuse side 424 of each of the outer teeth 154 can be greater than a length of the leg side 422 of each of the outer teeth 154. In other aspects, however, the lengths of the hypotenuse side 424 and the leg side 422 can vary. In other aspects, any or all of the outer teeth 154 may not define a right triangular shape, and can instead define any other suitable shape, triangular or otherwise.

Figure 5:
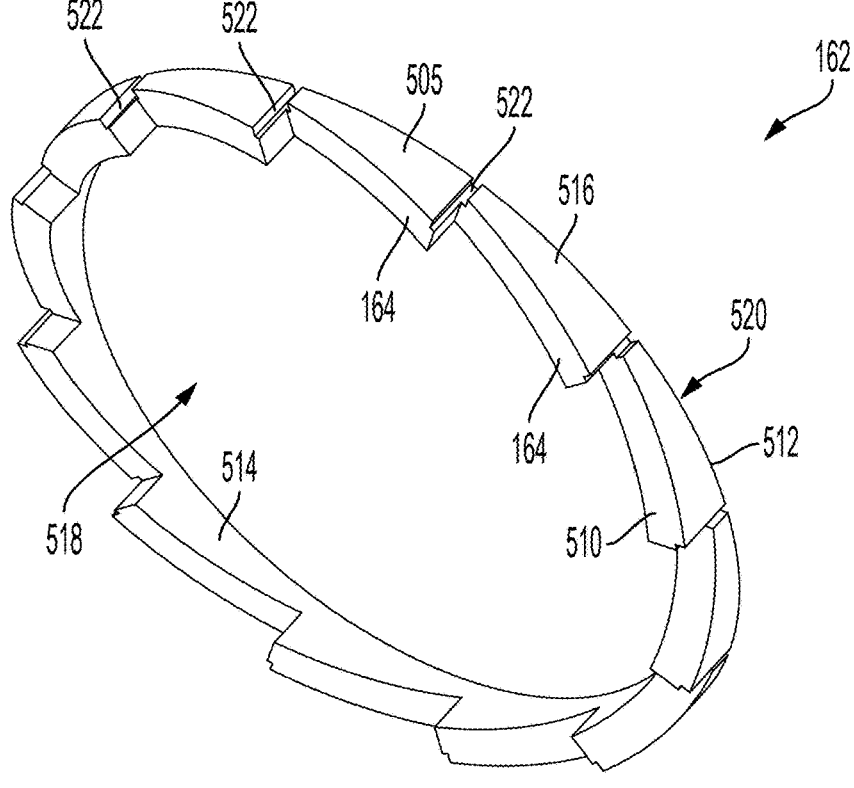
FIG. 5 is a perspective view of an inner crown of the pipe fitting of FIG. 1.

FIG. 5 illustrates a perspective view of the substantially annular inner crown 162. According to example aspects, the inner crown 162 can comprise an annular inner crown body 505. The inner crown body 505 can define a first inner crown side 510, an opposite second inner crown side 512, an inward inner crown surface 514, and an opposite outward inner crown surface 516. The inward inner crown surface 514 can define an inner crown void 518 extending centrally through the inner crown 162 from the first inner crown side 510 to the second inner crown side 512. In example aspects, the second inner crown side 512 can be configured to confront and abut the ramp 166 (shown in FIG. 1). The second inner crown side 512 can define a substantially planar inner crown side surface 520 in some aspects.

The inner crown 162 can further comprise the plurality of inner teeth 164 extending axially from the first inner crown side 510 of the inner crown body 505. Each of the inner teeth 164 can define the shape of a substantially right triangle in the present aspect. That is, each of the inner teeth 164 can define the leg side 422 extending axially outward from the inner crown body 505, substantially perpendicular thereto, and the hypotenuse side 424 extending between the leg side 422 and the inner crown body 505. The length of each hypotenuse side 424 can be greater than the length of the corresponding leg side 422 in the present aspect, through in other aspects, the lengths of the hypotenuse side 424 and the leg side 422 can vary. Moreover, in other aspects, any or all of the inner teeth 164 may not define a right triangular shape, and can instead define any other suitable shape, triangular or otherwise.

According to example aspects, the outward inner crown surface 516 can define a plurality of axial crown grooves 522 formed therein. In the present aspect, as shown, one of the axial crown grooves 522 can extend substantially along the leg side 422 of each of the inner teeth 164. Each of the axial crown grooves 522 can extend from the first inner crown side 510 to the second inner crown side 512. Each of the axial crown grooves 522 can be configured to slidingly receive a corresponding one of the axial guide ribs 220 (shown in FIG. 2) of the fitting body 110 (shown in FIG. 1) to allow the inner crown 162 to slide axially within the fitting bore 134 (shown in FIG. 1) of the fitting body 110.

Figure 6A:
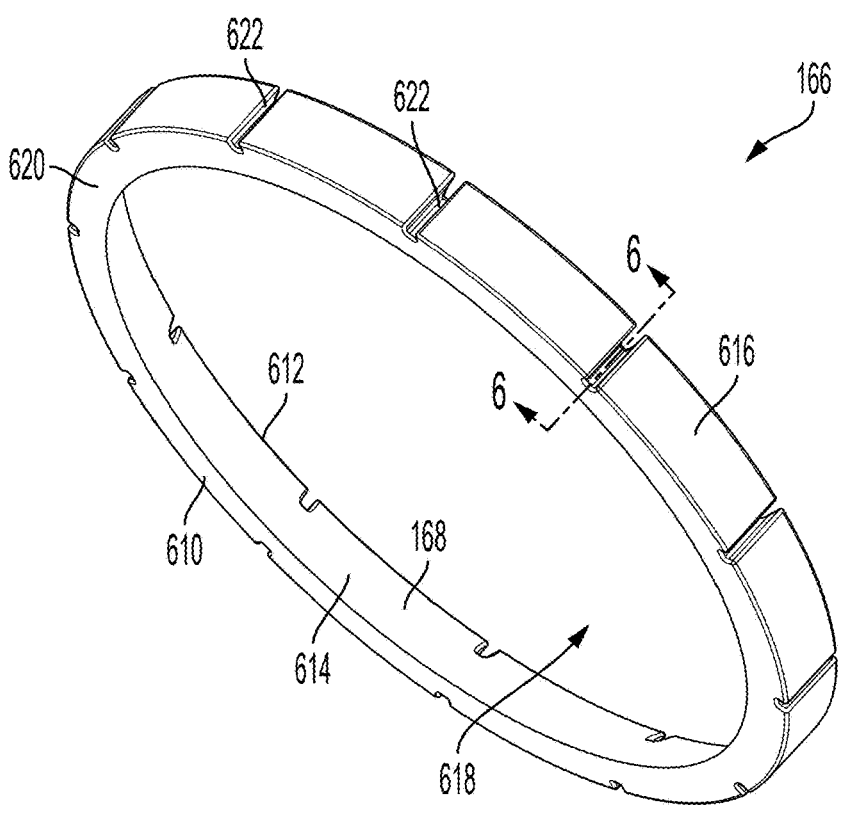
FIG. 6A is a perspective view of a ramp of the pipe fitting of FIG. 1.
Figure 6B:
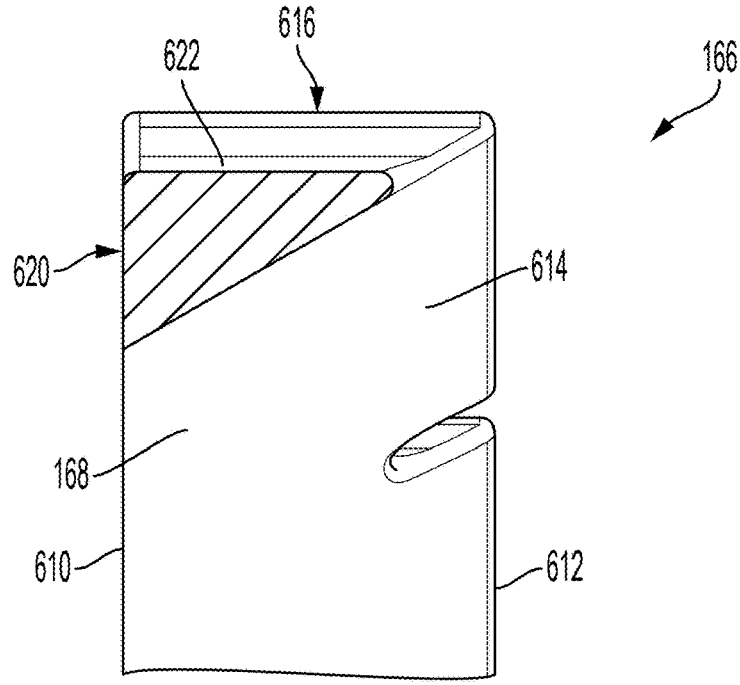
FIG. 6B is a cross-sectional view of the ramp of FIG. 6A, taken along line 6-6 in FIG. 6A.

FIG. 6A illustrates a perspective view of the ramp 166, and FIG. 6B illustrates a cross-sectional view of the ramp 166 taken along line 6-6 in FIG. 6A. Example aspects of the ramp 166 can define a first ramp side 610, an opposite second ramp side 612, an inward ramp surface 614, and an opposite outward ramp surface 616. The first ramp side 610 can define a substantially planar ramp side surface 620 extending radially inward from the outward ramp surface 616. Other aspects of the ramp side surface 620 may not be substantially planar. The ramp side surface 620 can be configured to confront and abut the inner crown side surface 520 (shown in FIG. 5) of the inner crown 162 (shown in FIG. 1). The inward ramp surface 614 can be angled between the first ramp side 610 and the outward ramp surface 616 to define the angled ramp surface 168 of the ramp 166. Thus, as shown in FIG. 6B, the ramp 166 can define a substantially triangular cross-section in the present aspect. In some aspects, the cross-sectional shape of the ramp 166 can be that of a substantially right triangle. Other aspects of the ramp 166 can define any other suitable cross-sectional shape. The inward ramp surface 614 can further define a ramp void 618 extending centrally through the ramp 166 from the first ramp side 610 to the second ramp side 612.

According to example aspects, the outward ramp surface 616 can define a plurality of axial ramp grooves 622 formed therein. Each of the axial ramp grooves 622 can extend from the first ramp side 610 to the second ramp side 612. In example aspects, a depth of the ramp 166 at the second ramp side 612 (i.e., where the inward ramp surface 614 meets the outward ramp surface 616) can be minimal, such that each of the axial ramp grooves 622 can further extend partially into the inward ramp surface 614 at the second ramp side 612. Like the axial crown grooves 522 (shown in FIG. 5) of the inner crown 162 (shown in FIG. 1), each of the axial ramp grooves 622 can be configured to slidingly receive a corresponding one of the axial guide ribs 220 (shown in FIG. 2) of the fitting body 110 (shown in FIG. 1) to allow the ramp 166 to slide axially within the fitting bore 134 (shown in FIG. 1) of the fitting body 110.

Figure 7A:
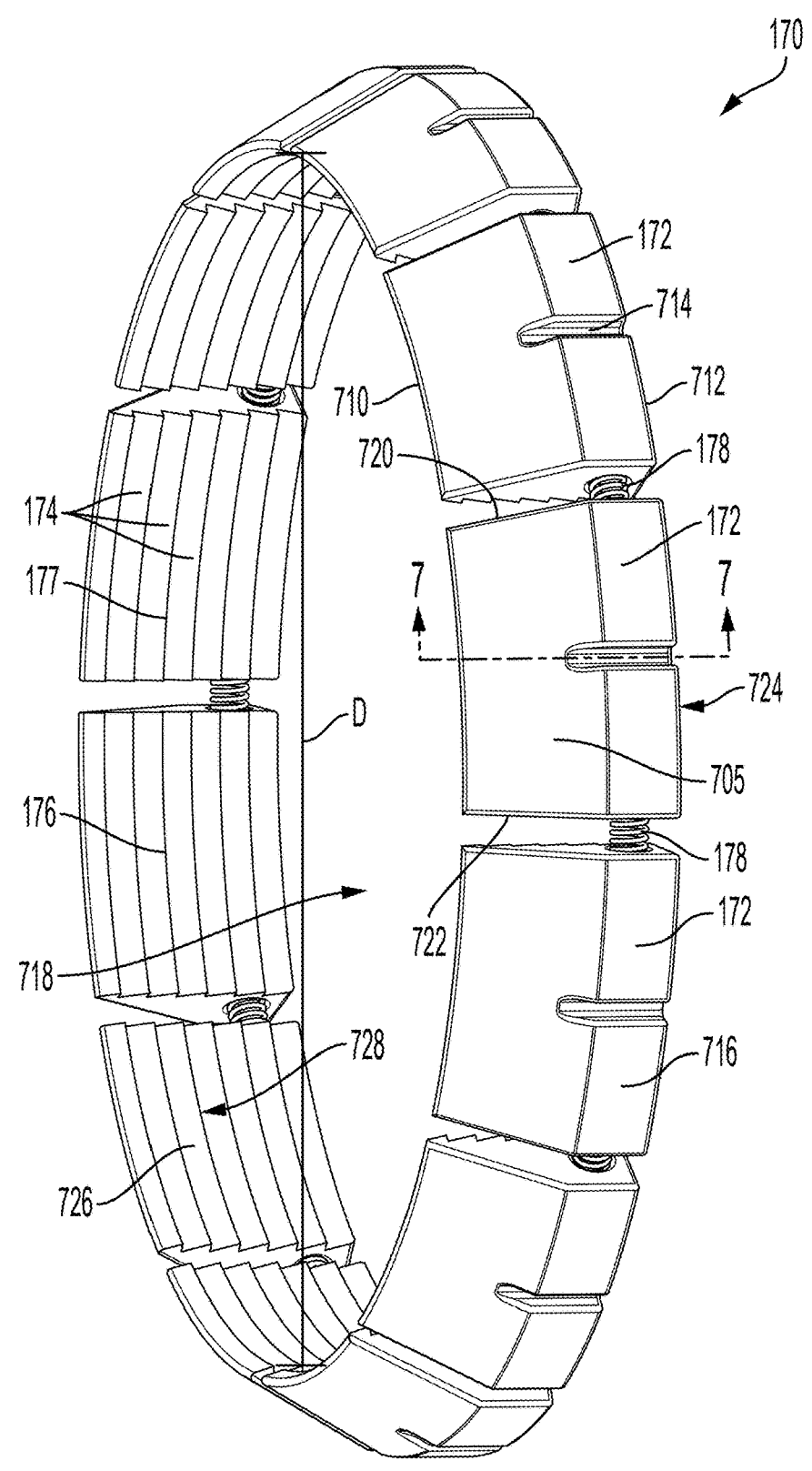
FIG. 7A is a perspective view of a grip ring of the pipe fitting of FIG. 1.
Figure 7B:
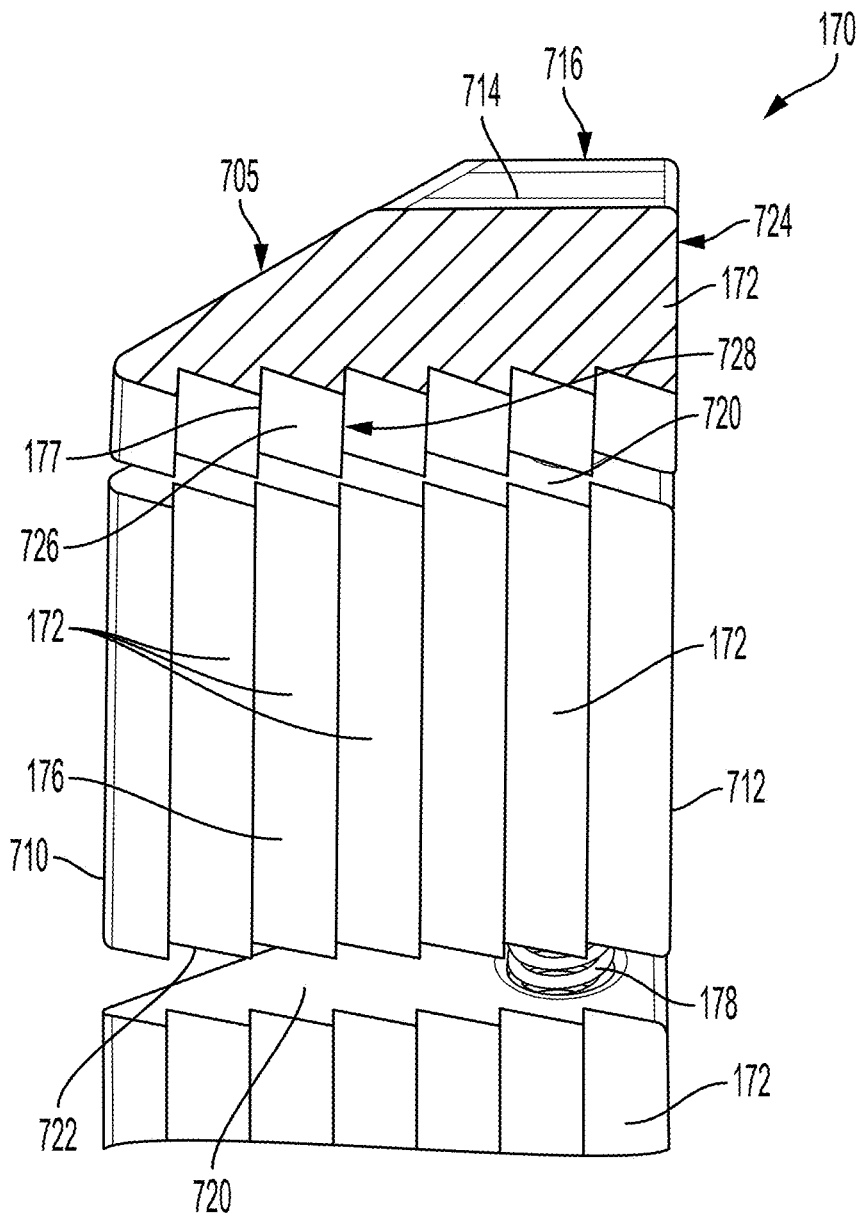
FIG. 7B is a cross-sectional view of the grip ring of FIG. 7A, taken along line 7-7 in FIG. 7A.

FIG. 7A illustrates a perspective view of the grip ring 170, and FIG. 7B illustrates a cross-sectional view of the grip ring 170 taken along line 7-7 in FIG. 7A. The annular grip ring 170 comprise a plurality of the gripper pads 172 spaced circumferentially about the grip ring 170. Each of the gripper pads 172 can define a first axial gripper side 710, an opposite second axial gripper side 712, the inward gripper surface 176, an opposite outward gripper surface 716, a first gripper end 720, and an opposite second gripper end 722. One of the corresponding gripper springs 178 can extend between and connect each pair of adjacent gripper pads 172. More specifically, each gripper spring 178 can extend between the first gripper end 720 of a first one of the gripper pads 172 and the second gripper end 722 of an adjacent second one of the gripper pads 172. The gripper springs 178 can allow the inner diameter D of the grip ring 170 to contract when the grip ring 170 is biased radially inward by the ramp 166 (shown in FIG. 1).

In example aspects, the outward gripper surface 716 of each gripper pad 172 can define an axial pad groove 714 formed therein. Each of the axial pad grooves 714 can extend from the angled ring surface 705 to the second axial gripper side 712, as shown. In some aspects, each of the axial pad grooves 714 can extend partially into the corresponding angled ring surface 705. In some aspects, like the axial crown grooves 522 (shown in FIG. 5) and the axial ramp grooves 622 (shown in FIG. 6), each of the axial pad grooves 714 can be configured to slidingly receive a corresponding one of the axial guide ribs 220 (shown in FIG. 2). In some aspects, however, the axial guide ribs 220 may not extend to reach the axial pad grooves 714.

The second axial gripper side 712 can define a substantially planar non-angled gripper side surface 724 (best seen in FIG. 7B) extending radially between the outward gripper surface 716 and the inward gripper surface 176. The non-angled gripper side surface 724 can be configured to confront and abut the substantially planar axially outer shoulder surface 240 (shown in FIG. 2) of the corresponding ring shoulder 140 (shown in FIG. 1) of the fitting body 110 (shown in FIG. 1). The inward gripper surfaces 714 of the gripper pads 172 can together define a ring void 718 extending centrally through the grip ring 170 from the first axial gripper sides 710 to the second axial gripper sides 712. The inward gripper surface 176 of each gripper pads 172 can further define one or more of the gripping ridges 174 extending radially into the ring void 718.

Each gripping ridge 174 can extend longitudinally between the first gripper end 720 and the second gripper end 722 of the corresponding gripper pad 172. In example aspects, the gripping ridges 174 can be curved to accommodate a curvature of the outer pipe surface of the corresponding pipe segment. In the present aspect, each of the gripping ridges 174 can define the substantially triangular cross-section, as shown. Moreover, in some aspects, each of the gripping ridges 174 can define an elongated, angled leading surface 726 facing generally inwards and toward the first axial gripper side 710 and a shortened trailing surface 728 (best seen in FIG. 7B) facing towards the second axial gripper side 712 and substantially perpendicular to the ring void 718. When the gripper pads 172 are biased radially inward by the ramp 166, the radially inward edge 177 of each of the gripping ridges 174 can engage and grip the outer pipe surface of the corresponding pipe segment to retain the pipe segment within the fitting bore 134 (shown in FIG. 1).

The outward gripper surface 716 can be substantially parallel with the ring void 718 and substantially perpendicular to the non-angled gripper side surface 724. The outward gripper surface 716 can be configured to face and contact the inner body surface 130 of the fitting body 110. According to example aspects, the first axial gripper side 710 of each gripper pad 172 can define the corresponding angled ring surface 705 extending between the outward gripper surface 716 and the inward gripper surface 176. The angled ring surface 705 can be angled toward the ramp 166 and configured to confront and slide along the angled ramp surface 168 (shown in FIG. 1) of the ramp 166.

In other aspects, the grip ring 170 can define other configurations as desired, such as a single monolithic unit comprising each gripper pad 172 attached to each other with thinner portions of the grip ring 170 extending between each gripper pad 170 instead of gripper springs 178.

Figure 8A:
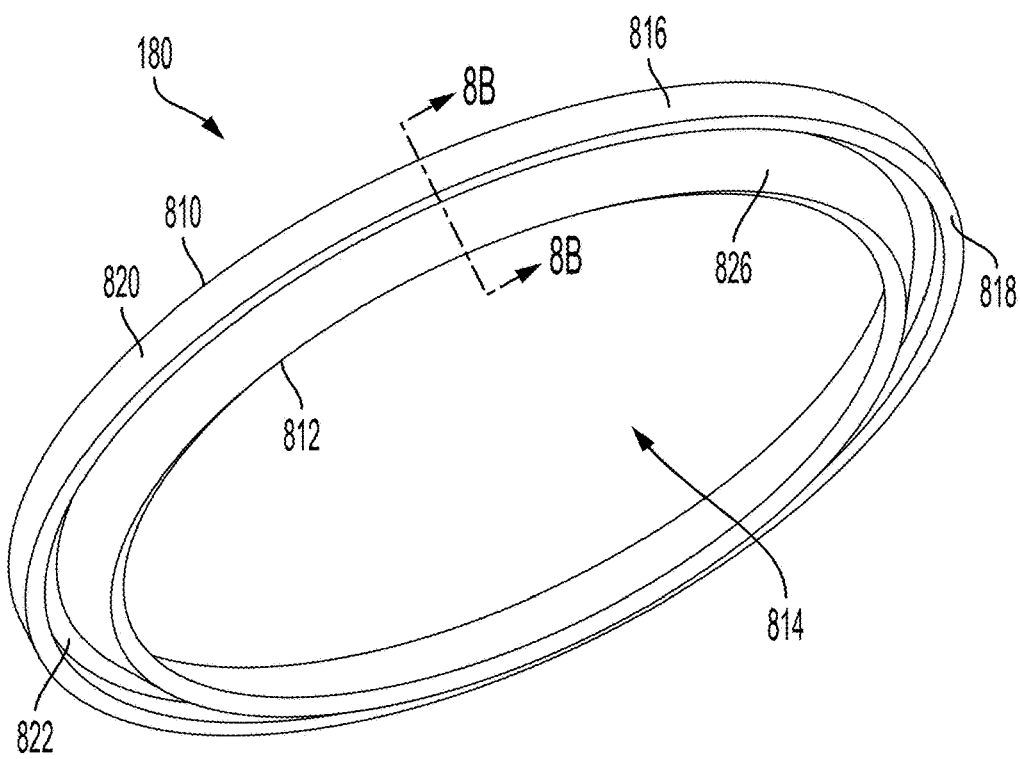
FIG. 8A is a perspective view of a seal of the pipe fitting of FIG. 1.
Figure 8B:
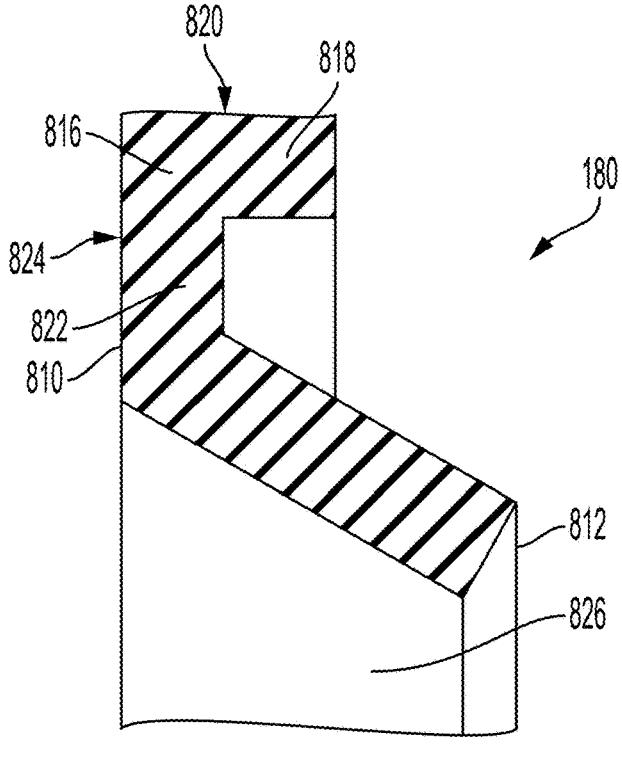
FIG. 8B is a cross-sectional view of the seal of FIG. 8A, taken along line 8-8 in FIG. 8A.

FIG. 8A illustrates a perspective view of the gasket 180, and FIG. 8B illustrates a cross-sectional view of the gasket 180 taken along line 8-8 in FIG. 8A. The gasket 180 can define a first gasket side 810 and a second gasket side 812. A gasket void 814 can extend centrally through the gasket 180 from the first gasket side 810 to the second gasket side 812. Example aspects of the annular gasket 180 can comprise a gasket body 816 and a gasket flange 826 extending radially inward from the gasket body 816. The gasket body 816 of the present aspect can define a substantially L-shaped cross-section. That is, the gasket body 816 can define a substantially axial gasket arm 818 and a substantially radial gasket leg 822 extending radially inward from and about perpendicular to the substantially axial gasket arm 818. The substantially radial gasket leg 822 can be arranged at the first gasket side 810, and the substantially axial gasket arm 818 can extend from the first gasket side 810 towards or to the second gasket side 812.

An outer arm surface 820 of the substantially axial gasket arm 818 can be configured to face and contact the inner body surface 130 (shown in FIG. 1) of the fitting body 110 (shown in FIG. 1). A substantially planar first leg surface 824 (shown in FIG. 8B) of the substantially radial gasket leg 822 can be configured to confront the substantially planar axially inner shoulder surface 242 (shown in FIG. 2) of the corresponding ring shoulder 140 (shown in FIG. 1) of the fitting body 110. The gasket flange 826 can extend radially inward from the substantially radial gasket leg 822, opposite the substantially axial gasket arm 818. The gasket flange 826 can be angled towards the second gasket side 812, as best seen in FIG. 8B. The gasket flange 826 can be configured to contact and seal with the outer pipe surface of the corresponding pipe segment.

In other aspects, the gasket 180 can define a different cross-sectional shape as desired, and any known gasket suitable for sealing against a pipe outer surface within a pipe fitting can be present in other aspects.

Figure 9:
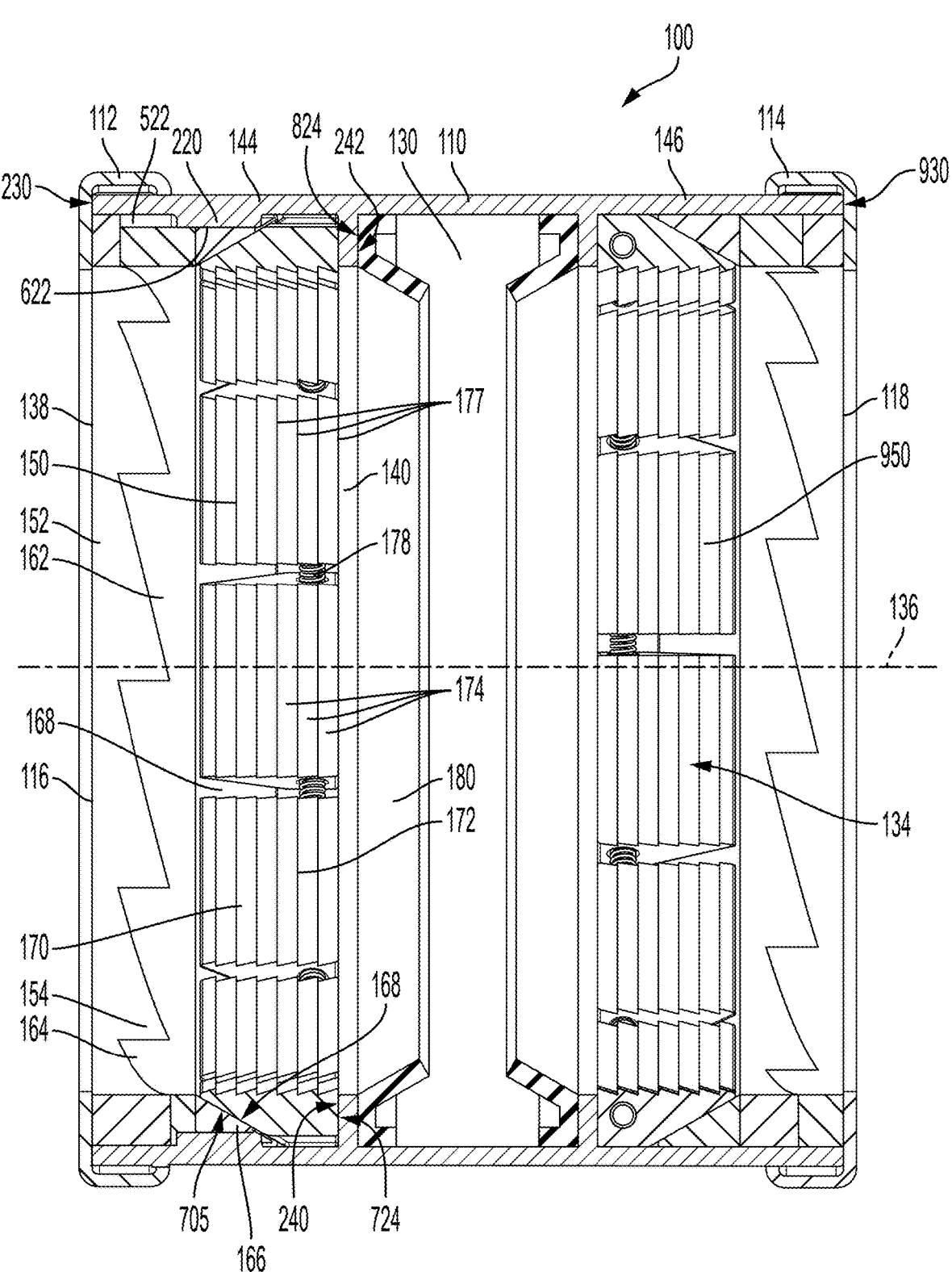
FIG. 9 is a cross-sectional view of the pipe fitting of FIG. 1, taken along line 9-9 in FIG. 1.

FIG. 9 illustrates a cross sectional view of the pipe fitting 100, taken along line 9-9 in FIG. 1. The pipe fitting 100 can comprise the fitting body 110, which can define the fitting bore 134 therethrough. The fitting bore 134 can define the fitting axis 136. The first retention cap 112 can be mounted to the fitting body 110 at the first fitting end 116, and the second retention cap 114 can be mounted to the fitting body 110 at the second fitting end 118. The first gripping assembly 150 can be substantially disposed within the fitting bore 134 at the first portion 144 of the fitting body 110, adjacent to the first fitting end 116, and the second gripping assembly 950 can be substantially disposed within the fitting bore 134 at the second portion 146 of the fitting body 110, adjacent to the second fitting end 118. The second gripping assembly 950 can be substantially a mirror image of the first gripping assembly 150.

Each of the first gripping assembly 150 and the second gripping assembly 950 can comprise the outer crown 152, the inner crown 162, the ramp 166, the grip ring 170, and the gasket 180. Referring to the first gripping assembly 150, the outer crown 152 can be arranged substantially within the fitting bore 134, axially between the first retention cap 112 and the inner crown 162. The outer teeth 154 of the outer crown 152 can nest with the inner teeth 164 of the inner crown 162, as previously described. The inner crown 162 can be arranged within the fitting bore 134, axially between the outer crown 152 and the ramp 166. As shown, the inner body surface 130 of the fitting body 110 can define the axial guide ribs 220, each of which can be slidably engaged with a corresponding one of the axial crown grooves 522 of the inner crown 162 and a corresponding one of the axial ramp grooves 622 of the ramp 166.

The ramp 166 can be arranged within the fitting bore 134, axially between the inner crown 162 and the grip ring 170. The angled ramp surface 168 of the ramp 166 can be angled towards the grip ring 170. The grip ring 170 can be arranged within the fitting bore 134, axially between the ramp 166 and the corresponding ring shoulder 140 of the fitting body 110. The grip ring 170 can comprise the plurality of gripper pads 172. The angled ring surfaces 705 of the gripper pads 172 can be angled towards the ramp 166. More specifically, the angled ring surfaces 705 can confront and slide along the angled ramp surface 168 of the ramp 166. The non-angled gripper side surfaces 724 of each gripper pad 172 can abut the axially outer shoulder surface 240 of the ring shoulder 140, as shown. The ring shoulder 140 can be arranged axially between the grip ring 170 and the gasket 180. The first leg surface 824 of the gasket 180 can abut the axially inner shoulder surface 242 of the ring shoulder 140.

As previously described, the pipe end of the first pipe segment can be inserted into the fitting bore 134 through the first bore opening 138. To grip the first pipe segment and couple the pipe fitting 100 thereto, the corresponding tightening fastener 190 (shown in FIG. 1) can be tightened to draw the crown fastener catch 158 (shown in FIG. 1) of the outer crown 152 towards the body fastener catch 142 (shown in FIG. 1) of the fitting body 110, which can rotate the outer crown body 156 within the fitting bore 134. The outer teeth 154 of the outer crown 152 can be nested with and rotated against the inner teeth 164 of the inner crown 162. The inner crown 162 can be rotationally fixed due the engagement of the axial guide ribs 220 of the fitting body 110 with the axial crown grooves 522 of the inner crown 162. Thus, the rotation of the outer crown 152 against the inner crown 162 can slide the inner crown 162 axially inward along the axial guide ribs 220. As the inner crown 162 slides axially inward, the inner crown 162 can press against the ramp 166 in the axially inward direction. The axial guide ribs 220 can further be engaged with the corresponding axial ramp grooves 622 of the ramp 166, and the ramp 166 can slide axially inwards along the axial guide ribs 220 simultaneously with the inner crown 162.

The angled ramp surface 168 of the ramp 166 can confront the angled ring surface 705 of each of the gripper pads 172. Each of the gripper pads 172 can further confront the ring shoulder 140 of the fitting body 110, which can prohibit the grip ring 170 from sliding axially inward towards the gasket 180. As the ramp 166 slides axially inward along the axial guide ribs 220, the angled ramp surface 168 thereof can slide and press against the angled ring surface 705 of each gripper pad 172. Along with the confrontation of the gripper pads 172 with the ring shoulder 140, the ramp 166 can bias each of the gripper pads 172 radially inward. As the gripper pads 172 are biased radially inward, each of the gripper springs 178 can be compressed between the adjacent corresponding gripper pads 172 to allow the inner diameter D (shown in FIG. 7A) of the grip ring 170 to decrease. The radially inward edge 177 of each of the gripping ridges 174 can grip onto, and in some instances can bite into, the outer pipe surface of the first pipe segment. The second gripping assembly 950 can be configured to grip the second pipe segment in the same manner to couple the pipe fitting 100 thereto.

Figure 10:
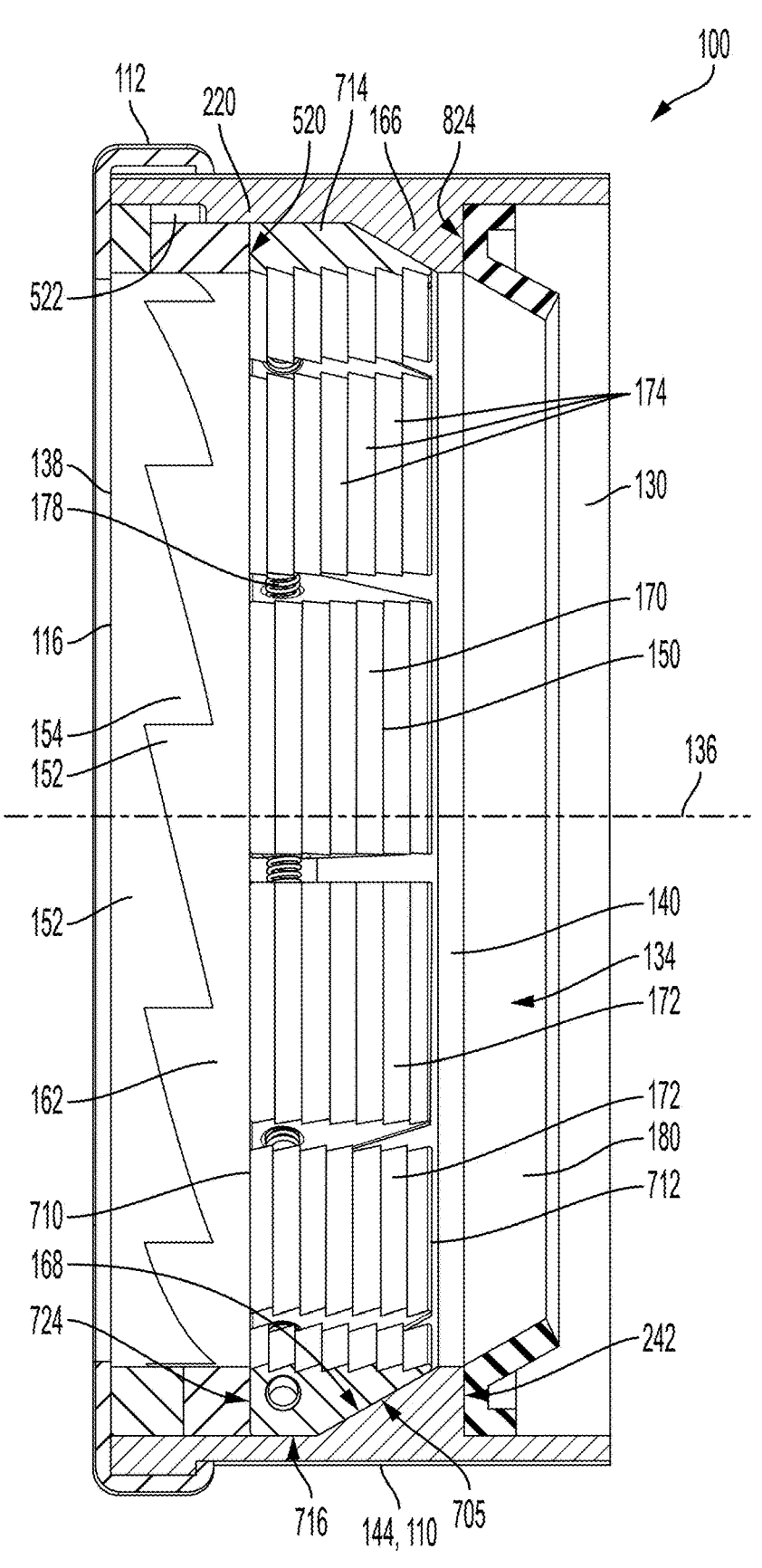
FIG. 10 is a cross-sectional view of the pipe fitting, in accordance with another aspect of the present disclosure, taken along a line similar to 9-9 in FIG. 1.

FIG. 10 is a cross-sectional view of the pipe fitting 100 in accordance with another example aspect of the present disclosure, taken along a line similar to 9-9 in FIG. 1. In the present view, for the sake of simplicity, only the first portion 144 of the fitting body 110 and the first gripping assembly 150 are shown. The second portion 146 (shown in FIG. 1) of the fitting body 110 and the second gripping assembly 950 (shown in FIG. 9) can be substantially a mirror image of the first portion 144 and the first gripping assembly 150, respectively. The pipe fitting 100 can comprise the fitting body 110, and the inner body surface 130 can define the fitting bore 134. The fitting axis 136 can extend centrally through the fitting bore 134. The first retention cap 112 can be mounted to the fitting body 110 at the first fitting end 116, and the second retention cap 114 (shown in FIG. 1) can be mounted to the fitting body 110 at the second fitting end 118 (shown in FIG. 2). The first gripping assembly 150 can be substantially disposed within the fitting bore 134 at the first portion 144 of the fitting body 110, adjacent to the first fitting end 116, and the second gripping assembly 950 can be substantially disposed within the fitting bore 134 at the second portion 146 of the fitting body 110, adjacent to the second fitting end 118.

Each of the first gripping assembly 150 and the second gripping assembly 950 can comprise the outer crown 152, the inner crown 162, the grip ring 170, and the gasket 180. However, in the present aspect, the ramp 166 can be integrally and/or monolithically formed (i.e., formed a singular component that constitutes a single material without joints or seams) with the fitting body 110. The outer crown 152 can be arranged substantially within the fitting bore 134, axially between the first retention cap 112 and the inner crown 162. The outer teeth 154 of the outer crown 152 can nest with the inner teeth 164 of the inner crown 162. The inner crown 162 can be arranged within the fitting bore 134, axially between the outer crown 152 and the grip ring 170. The inner body surface 130 of the fitting body 110 can define the axial guide ribs 220, each of which can slidably engage a corresponding one of the axial crown grooves 522 of the inner crown 162.

The grip ring 170 can be arranged within the fitting bore 134, axially between the inner crown 162 and the ramp 166. In the present aspect, the orientation of the non-angled gripper side surfaces 724 and the angled ring surfaces 705 can be reversed, such that the non-angled gripper side surface 724 can be arranged at the first axial gripper side 710 and the angled ring surfaces 705 can be arranged at the second axial gripper side 712. The non-angled gripper side surfaces 724 of each gripper pad 172 can abut the substantially planar inner crown side surface 520 of the inner crown 162. The outward gripper surface 716 of each gripper pad 172 can define the axial pad groove 714. Each of the axial guide ribs 220 can thereby further engage a corresponding one of the axial pad grooves 714 formed in the outward gripper surface 716. Moreover, in some example aspects, the axial pad grooves 714 may also extend to the angled ring surfaces 705, and each of the axial guide ribs 220 extending along the inner body surface 130 can further extend at least partially along the angled ramp surface 168 of the ramp 166, such that the axial guide ribs 220 can further engage the portion of the axial pad grooves 714 formed in the angled ring surfaces 705 of the gripper pads 172.

As shown, the ramp 166 can be arranged within the fitting bore 134, axially between the grip ring 170 and the ring shoulder 140. In the present aspect, the ramp 166 can extend radially inward from the inner body surface 130 of the fitting body 110 and can be monolithically formed with the ring shoulder 140, such that the axially outer shoulder surface 240 (shown in FIG. 2) of the ring shoulder 140 can be replaced with the angled ramp surface 168 of the ramp 166. The angled ramp surface 168 of the ramp 166 can be angled towards the grip ring 170, and the angled ring surfaces 705 of the gripper pads 172 can be angled towards the ramp 166. More specifically, the angled ring surfaces 705 can confront and slide along the angled ramp surface 168. Moreover, the ring shoulder 140 can be arranged axially between the ramp 166 and the gasket 180. The first leg surface 824 of the gasket 180 can abut the axially inner shoulder surface 242 of the ring shoulder 140.

The pipe end of the first pipe segment can be inserted into the fitting bore 134 through the first bore opening 138. To grip the first pipe segment and couple the pipe fitting 100 thereto, the corresponding tightening fastener 190 (shown in FIG. 1) can be tightened to draw the crown fastener catch 158 (shown in FIG. 1) of the outer crown 152 towards the body fastener catch 142 (shown in FIG. 1) of the fitting body 110, which can rotate the outer crown body 156 within the fitting bore 134. The outer teeth 154 of the outer crown 152 can be nested with and rotated against the inner teeth 164 of the inner crown 162. The inner crown 162 can be rotationally fixed due the engagement of the axial guide ribs 220 of the fitting body 110 with the axial crown grooves 522 of the inner crown 162. Thus, the rotation of the outer crown 152 against the inner crown 162 can slide the inner crown 162 axially inward along the axial guide ribs 220. As the inner crown 162 slides axially inward, the inner crown 162 can press against the grip ring 170 in the axially inward direction. The axial guide ribs 220 can further be engaged with the corresponding axial pad grooves 714 of the grip ring 170, and the grip ring 170 can slide axially inwards along the axial guide ribs 220 simultaneously with the inner crown 162.

Figure 11:
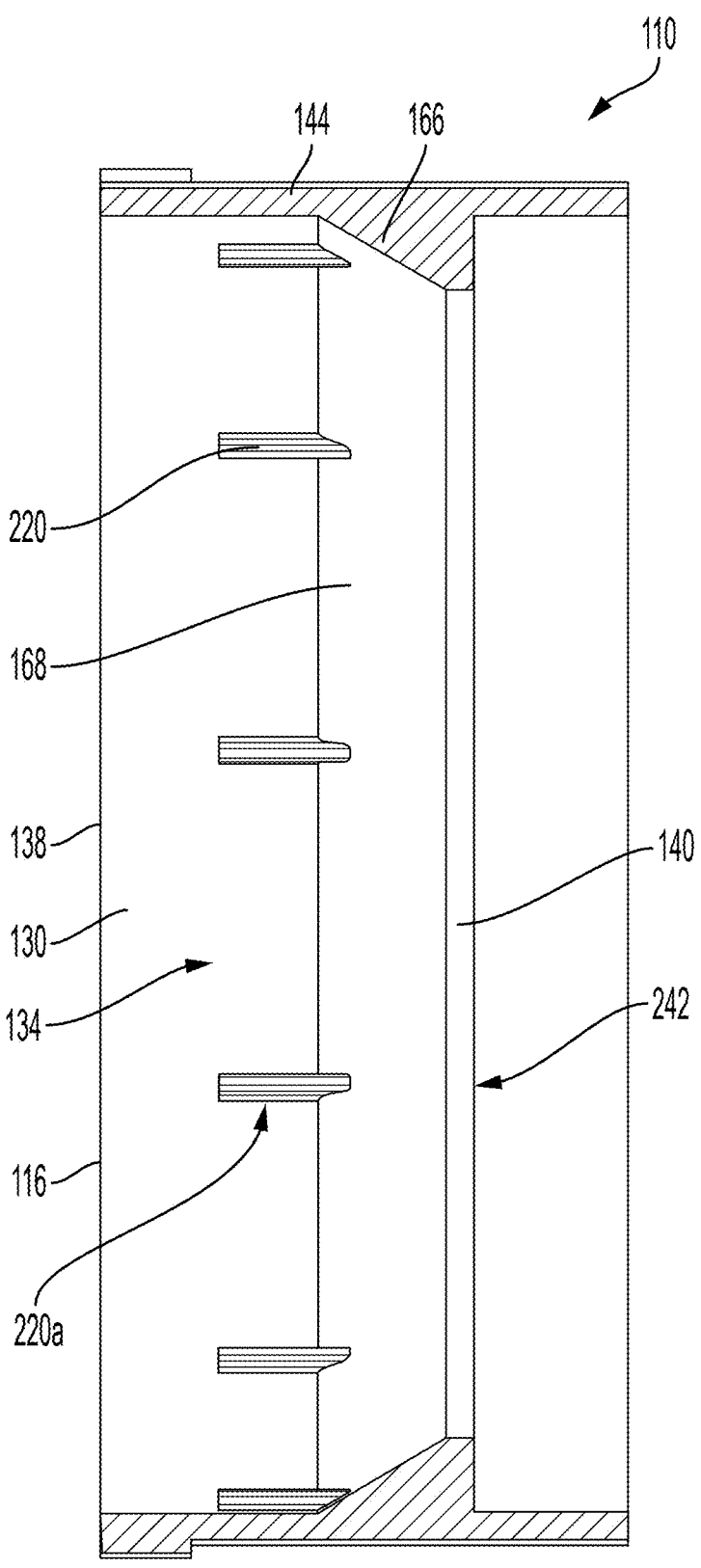
FIG. 11 is a cross-sectional view of the fitting body of the pipe fitting of FIG. 10, taken along a line similar to 9-9 in FIG. 1.

Opposite the inner crown 162, the angled ring surfaces 705 of the gripper pads 172 can confront the angled ramp surface 168 of the ramp 166 formed monolithically with the fitting body 110. As the grip ring 170 slides axially inward along the axial guide ribs 220, the angled ring surfaces 705 thereof can slide and press against the angled ramp surface 168 of the ramp 166. In addition to the grip ring 170 sliding axially inward along the angled ramp surface 168 of the ramp 166, the ramp 166 can also bias each of the gripper pads 172 radially inward. As the gripper pads 172 are biased radially inward, each of the gripper springs 178 can be compressed between the adjacent corresponding gripper pads 172 to allow the inner diameter D (shown in FIG. 7A) of the grip ring 170 to decrease. As previously described, the gripping ridges 174 of the gripper pads 172 can grip, and in some instances can bite into, the outer pipe surface of the first pipe segment. The second gripping assembly 950 can be configured to grip the second pipe segment in the same manner to couple the pipe fitting 100 thereto. FIG. 11 illustrates the first portion 144 of the fitting body 110 with the ramp 166 formed monolithically therewith, and with the axial guide ribs 220 extending at least partially along the angled ramp surface 168 of the ramp 166.

Figure 12:
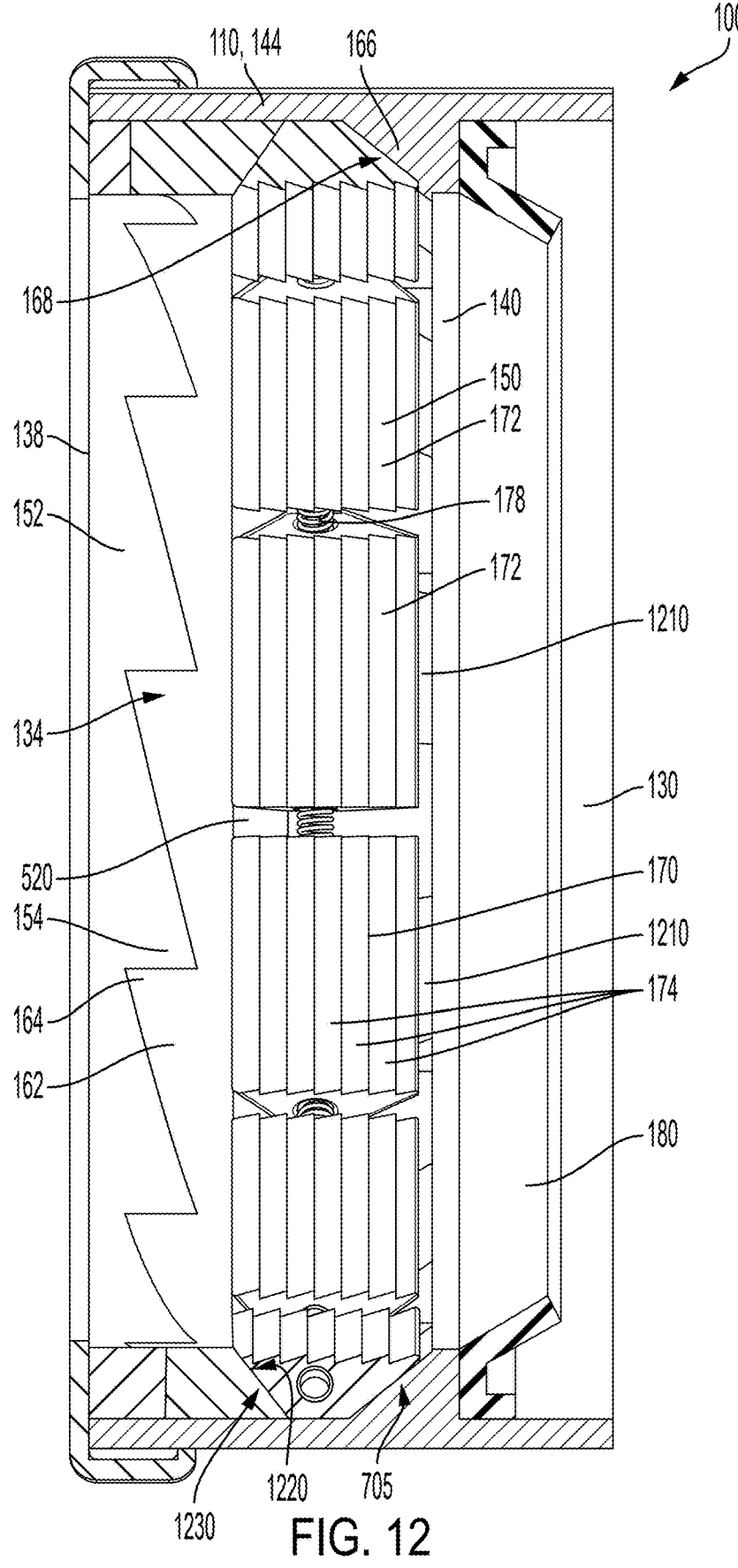
FIG. 12 is a cross-sectional view of the pipe fitting, in accordance with another aspect of the present disclosure, taken along a line similar to 9-9 in FIG. 1.

FIG. 12 is a cross-sectional view of the pipe fitting 100 in accordance with another example aspect of the present disclosure, taken along a line similar to 9-9 in FIG. 1. In the present view, for the sake of simplicity, only the first portion 144 of the fitting body 110 and the first gripping assembly 150 are shown. The second portion 146 (shown in FIG. 1) of the fitting body 110 and the second gripping assembly 950 (shown in FIG. 9) can be substantially a mirror image of the first portion 144 and the first gripping assembly 150, respectively. The pipe fitting 100 of the present aspect can be similar to the pipe fitting 100 of FIGS. 10 and 11, with a few differences.

Figure 13:
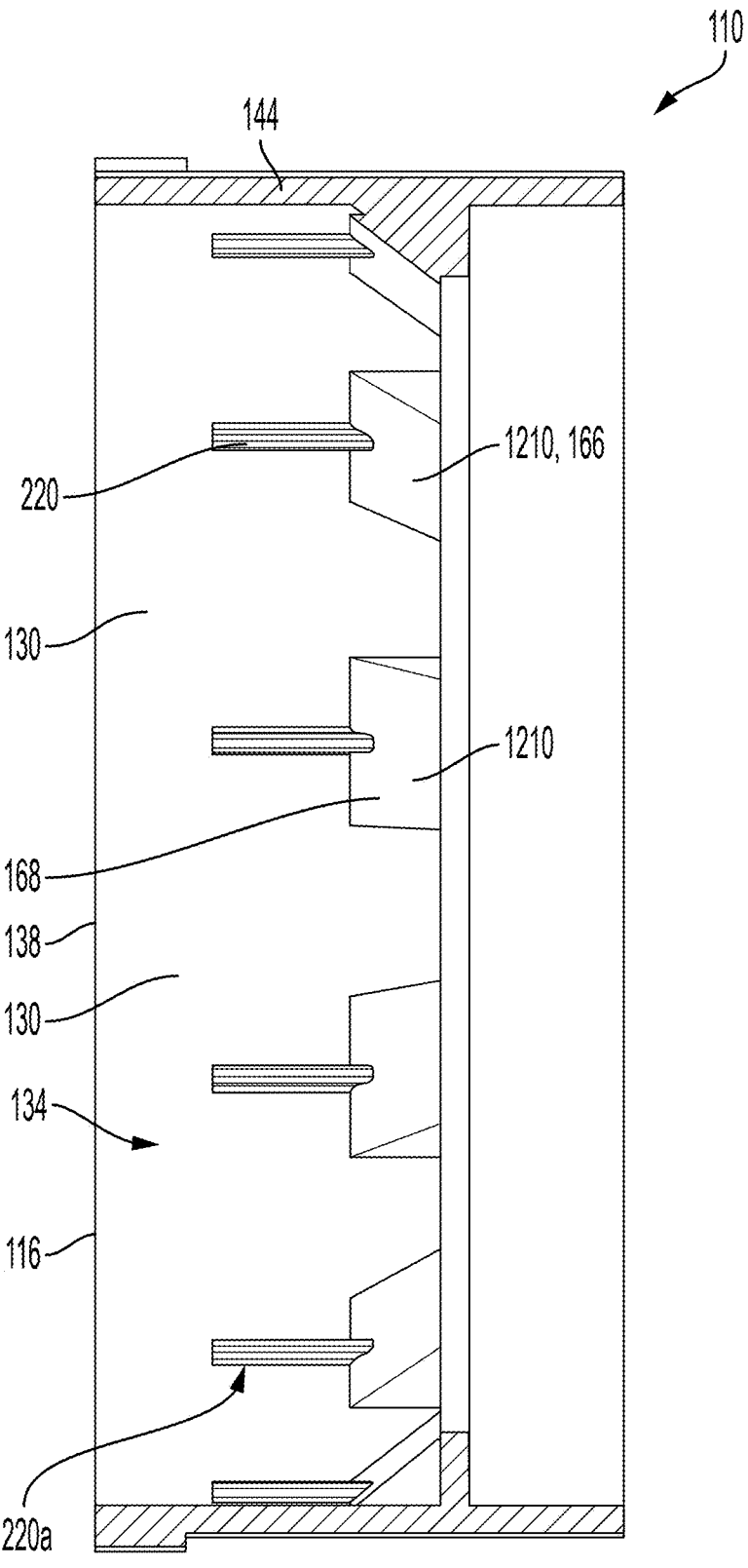
FIG. 13 is a cross-sectional view of the fitting body of the pipe fitting of FIG. 12, taken along a line similar to 9-9 in FIG. 1.

In particular, in the present aspect, the ramp 166 formed monolithically with the fitting body 110 is not an annular ramp 166 as previously shown, but rather can be segmented into a plurality of ramp pads 1210 spaced circumferentially about the inner body surface 130, as shown. Each of the ramp pads 1210 can extend radially inward from the inner body surface 130 of the fitting body 110 and can be monolithically formed with the ring shoulder 140. As shown in FIG. 13, each of the axial guide ribs 220 can extend at least partially along a corresponding one of the ramp pads 1210.

Additionally, in the present aspect, the inner crown side surface 520 of the inner crown can be angled to face both radially and axially inward towards the grip ring 170, thereby defining an angled inner crown side surface 1220. Moreover, each of the non-angled gripper side surfaces 724 (shown in FIG. 7) of each gripper pad 172 can be replaced with a second angled gripper side surface 1230 opposite the angled ring surface 705. The second angled gripper side surface 1230 can be angled to face both radially and axially outwards towards the inner crown 162. The angled ring surfaces 705 of the grip ring 170 can be configured to slide along the angled ramp surface 168 of the ramp 166, and the opposite second angled gripper side surfaces 1230 of the grip ring 170 can be configured to slide along the angled inner crown side surface 1220 of the inner crown 162.

The pipe end of the first pipe segment can be inserted into the fitting bore 134 through the first bore opening 138. To grip the first pipe segment and couple the pipe fitting 100 thereto, the corresponding tightening fastener 190 (shown in FIG. 1) can be tightened to draw the crown fastener catch 158 (shown in FIG. 1) of the outer crown 152 towards the body fastener catch 142 (shown in FIG. 1) of the fitting body 110, which can rotate the outer crown body 156 within the fitting bore 134. The outer teeth 154 of the outer crown 152 can be nested with and rotated against the inner teeth 164 of the inner crown 162. The inner crown 162 can be rotationally fixed due the engagement of the axial guide ribs 220 (shown in FIG. 13) of the fitting body 110 with the axial crown grooves 522 (shown in FIG. 5) of the inner crown 162. Thus, the rotation of the outer crown 152 against the inner crown 162 can slide the inner crown 162 axially inward along the axial guide ribs 220.

As the inner crown 162 slides axially inward, the inner crown 162 can press against the grip ring 170 in the axially inward direction, biasing the grip ring 170 axially towards the ramp 166. Additionally, the second angled gripper side surfaces 1230 of the grip ring 170 can slide along the angled inner crown side surface 1220 of the inner crown 162, and the angled ring surfaces 705 of the grip ring 170 can slide along the angled ramp surface 168 of the ramp 166, biasing the grip ring 170 radially inward. The axial guide ribs 220 can be engaged with the corresponding axial pad grooves 714 (shown in FIG. 7) of the grip ring 170 to guide the grip ring 170 as it slides along the angled ramp surface 168 of the ramp 166. As the gripper pads 172 are biased radially inward, each of the gripper springs 178 can be compressed between the adjacent corresponding gripper pads 172 to allow the inner diameter D (shown in FIG. 7A) of the grip ring 170 to decrease. As previously described, the gripping ridges 174 of the gripper pads 172 can grip, and in some instances can bite into, the outer pipe surface of the first pipe segment. The second gripping assembly 950 can be configured to grip the second pipe segment in the same manner to couple the pipe fitting 100 thereto. FIG. 13 illustrates the first portion 144 of the fitting body 110 with the ramp pads 1210 formed monolithically therewith, and with each of the axial guide ribs 220 extending at least partially along a corresponding one of the ramp pads 1210. In other aspects, the axial guide ribs 220 may not extend along the ramp 166 and/or the ramp pads 1210.

Figure 14:
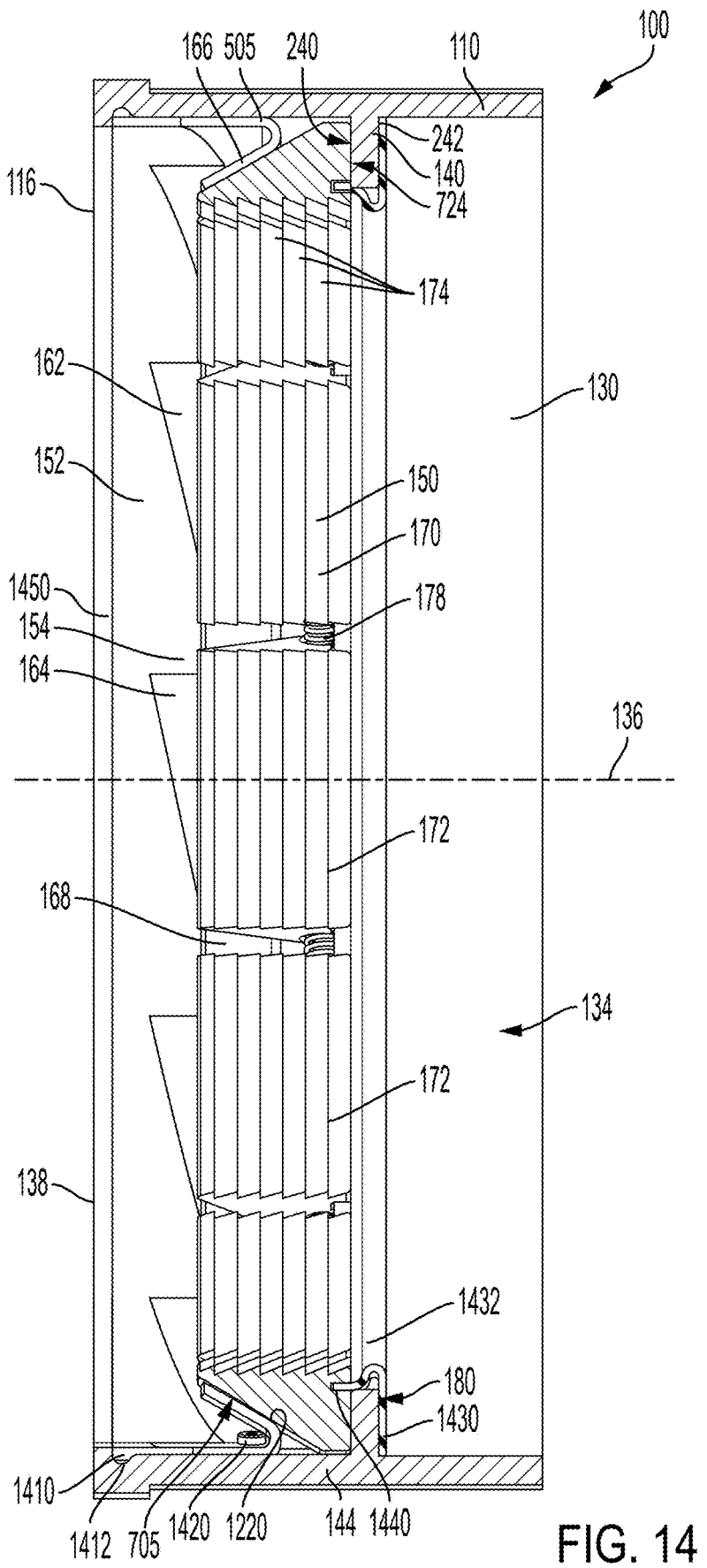
FIG. 14 is a cross-sectional view of the pipe fitting, in accordance with another aspect of the present disclosure, taken along a line similar to 9-9 in FIG. 1.

FIG. 14 is a cross-sectional view of the pipe fitting 100 in accordance with another example aspect of the present disclosure, taken along a line similar to 9-9 in FIG. 1. In the present view, for the sake of simplicity, only the first portion 144 of the fitting body 110 and the first gripping assembly 150 are shown. The second portion 146 (shown in FIG. 1) of the fitting body 110 and the second gripping assembly 950 (shown in FIG. 9) can be substantially a mirror image of the first portion 144 and the first gripping assembly 150, respectively. In the present aspect, the pipe fitting 100 can comprise the fitting body 110, and the inner body surface 130 thereof can define the fitting bore 134. The fitting axis 136 can extend centrally through the fitting bore 134. The first gripping assembly 150 can be substantially disposed within the fitting bore 134 at the first portion 144 of the fitting body 110, adjacent to the first fitting end 116, and the second gripping assembly 950 can be substantially disposed within the fitting bore 134 at the second portion 146 of the fitting body 110, adjacent to the second fitting end 118 (shown in FIG. 1).

Each of the first gripping assembly 150 and the second gripping assembly 950 can comprise the outer crown 152, the inner crown 162, the grip ring 170, and the gasket 180. The outer crown 152 can be arranged substantially within the fitting bore 134, axially between the first fitting end 116 and the inner crown 162. In some aspects, the outer crown 152 can define an annular flange 1410 configured to engage an annular channel 1412 formed in the inner body surface 130, as shown. The engagement of the annular flange 1410 with the annular channel 1412 can prohibit axial movement of the outer crown 152 within the fitting bore 134. Additionally and/or alternatively, the fitting body 110 can define a lip 1450 extending radially inward at the first fitting end 116, which can aid in retaining the outer crown 152 within the fitting bore 134.

As previously described, the outer teeth 154 of the outer crown 152 can nest with the inner teeth 164 of the inner crown 162. The inner crown 162 can be arranged within the fitting bore 134, axially between the outer crown 152 and the grip ring 170. In the present aspect, the inner crown 162 can further define the ramp 166 formed integrally and/or monolithically therewith. The inner crown 162 can generally define a V-shaped cross-section, as shown. In other aspects, the inner crown 162 can define any other suitably cross-sectional shape. According to example aspects, the substantially annular inner crown body 505 and the inner teeth 164 can extend in a substantially axial direction and can confront the inner body surface 130. The ramp 166 formed monolithically with the inner crown 162 can extend from the inner crown body 505, opposite the inner teeth 164, and can be angled radially inward therefrom. The ramp 166 can define the angled ramp surface 168, which in the present aspect, can be the same surface as the angled inner crown side surface 1220.

In the present aspect, instead of the axial guide ribs 220 (shown in FIG. 2) and the axial crown grooves 522 (shown in FIG. 5), the pipe fitting 100 can comprise one or more sliding guide pins 1420 coupled to the inner crown body 505 of the inner crown 162. The inner body surface 130 of the fitting body 110 can define one or more corresponding axial guide channels 1510 (shown in FIG. 15), within which the sliding guide pins 1420 can be configured to slide. The inner crown 162 can be rotationally fixed by the engagement of the sliding guide pins 1420 with the axial guide channels 1510, but can slide in the axial direction as the outer teeth 154 of the outer crown 152 are rotated against the inner teeth 164 of the inner crown 162 and the sliding guide pins 1420 slide axially within the axial guide channels 1510.

The angled inner crown side surface 1220 of the inner crown 162 (which can also be the angled ramp surface 168 of the ramp 166 in the present aspect) can be angled towards the grip ring 170. The grip ring 170 can be arranged within the fitting bore 134, axially between the inner crown 162 and the corresponding ring shoulder 140 of the fitting body 110. The grip ring 170 can comprise the plurality of gripper pads 172. The angled ring surfaces 705 of the gripper pads 172 can be angled towards the inner crown 162. More specifically, the angled ring surfaces 705 can confront and slide along the angled inner crown side surface 1220 of the inner crown 162. The non-angled gripper side surfaces 724 of each gripper pad 172 can abut the axially outer shoulder surface 240 of the ring shoulder 140, as shown. Furthermore, the ring shoulder 140 can be arranged axially between the grip ring 170 and the gasket 180. In the present aspect, the gasket 180 can comprise an alternative configuration, wherein a substantially radial gasket portion 1430 of the gasket 180 can abut the axially inner shoulder surface 242 of the ring shoulder 140 and a substantially axial gasket portion 1432 of the gasket 180 can extend from the substantially radial gasket portion 1430, over the ring shoulder 140, and can engage a gasket groove 1440 formed in each of the gripper pads 172.

As previously described, the pipe end of the first pipe segment can be inserted into the fitting bore 134 through the first bore opening 138. To grip the first pipe segment and couple the pipe fitting 100 thereto, the corresponding tightening fastener 190 (shown in FIG. 1) can be tightened to draw the crown fastener catch 158 (shown in FIG. 1) of the outer crown 152 towards the body fastener catch 142 (shown in FIG. 1) of the fitting body 110, which can rotate the outer crown body 156 within the fitting bore 134. The outer teeth 154 of the outer crown 152 can be nested with and rotated against the inner teeth 164 of the inner crown 162. The inner crown 162 can be rotationally fixed due the engagement of the sliding guide pins 1420 with the axial guide channels 1510 of the fitting body 110. Thus, the rotation of the outer crown 152 against the inner crown 162 can slide the inner crown 162 axially inward along the axial guide channels 1510. As the inner crown 162 slides axially inward, the angled inner crown side surface 1220 can slide and press against the angled ring surface 705 of each gripper pad 172. Along with the confrontation of the gripper pads 172 with the ring shoulder 140, the ramp 166 can bias each of the gripper pads 172 radially inward. As the gripper pads 172 are biased radially inward, each of the gripper springs 178 can be compressed between the adjacent corresponding gripper pads 172 to allow the inner diameter D (shown in FIG. 7A) of the grip ring 170 to decrease. The gripping ridges 174 of the gripper pads 172 can grip, and in some instances can bite into, the outer pipe surface of the first pipe segment. The second gripping assembly 950 can be configured to grip the second pipe segment in the same manner to couple the pipe fitting 100 thereto.

Figure 15:
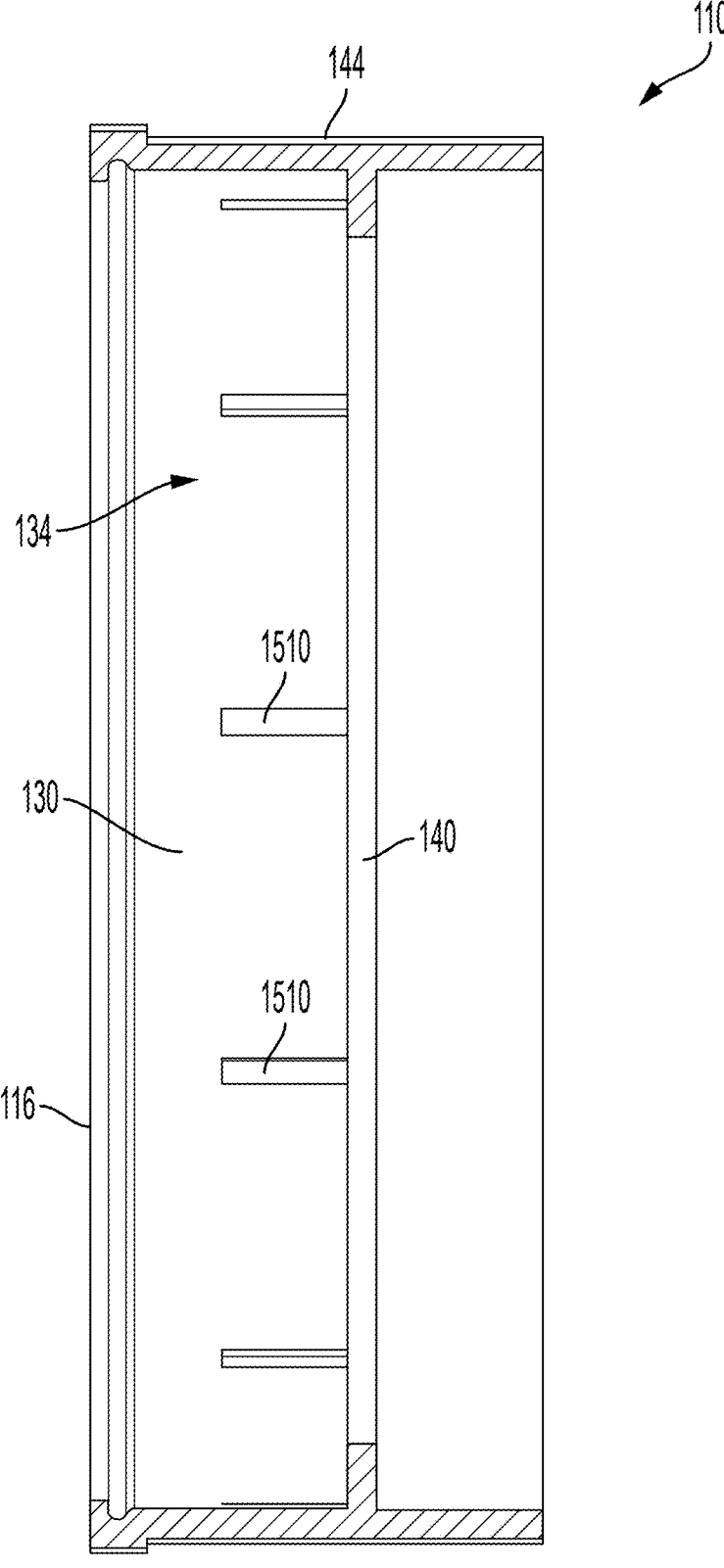
FIG. 15 is a cross-sectional view of the fitting body of the pipe fitting of FIG. 14, taken along a line similar to 9-9 in FIG. 1.

FIG. 15 illustrates the first portion 144 of the fitting body 110 with the one or more axial guide channels 1510 formed in the inner body surface 130 thereof. Each of the axial guide channels 1510 can be configured to slidably receive a corresponding one of the sliding guide pins 1420 (shown in FIG. 14) therein. In the present aspect, each of the axial guide channels 1510 can extend from an intermediate location between the first fitting end 116 and the ring shoulder 140 axially inward to the ring shoulder 140.

Figure 16A:
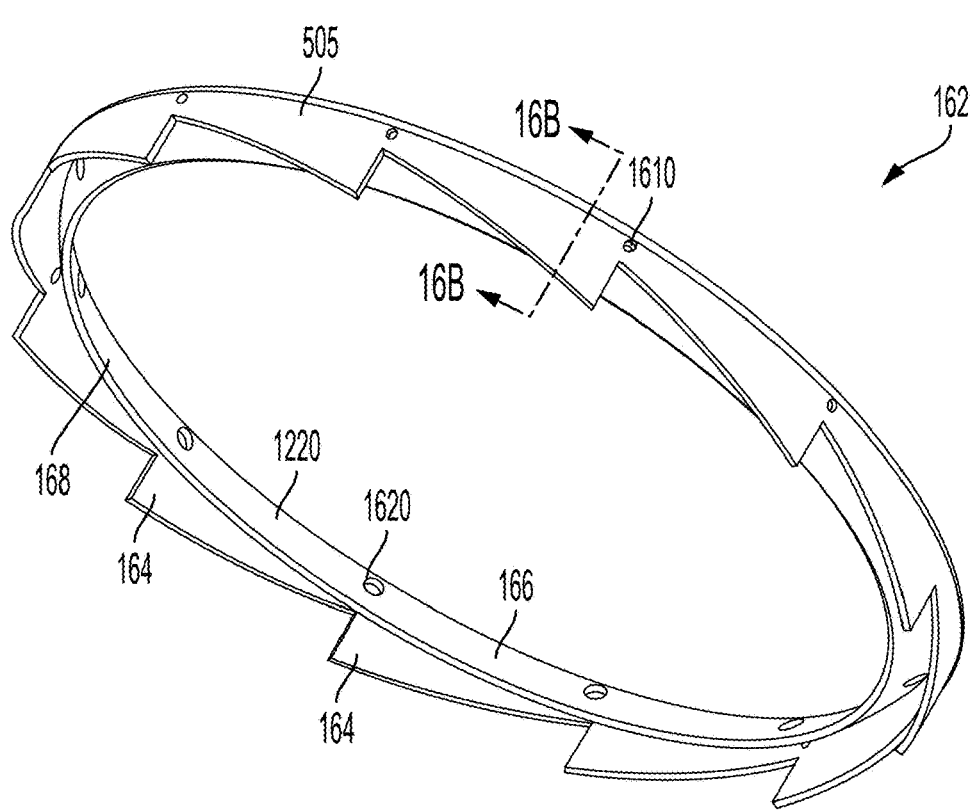
FIG. 16A is a perspective view of the inner crown of the pipe fitting of FIG. 14, wherein the ramp is formed monolithically with the inner crown.
Figure 16B:
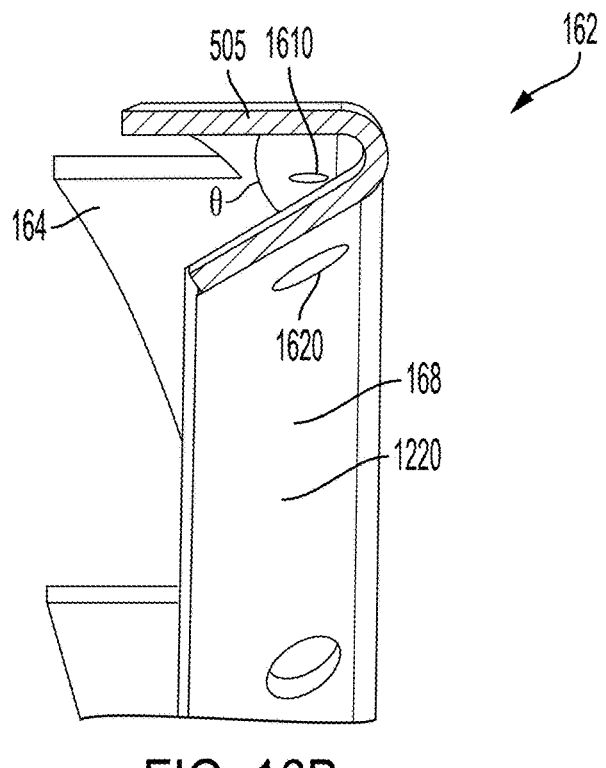
FIG. 16B is a cross-sectional view of the inner crown of FIG. 16A, taken along line 16-16 in FIG. 16A.

FIG. 16A illustrates a perspective view of the inner crown 162 comprising the ramp 166 formed integrally and/or monolithically therewith, and FIG. 16B illustrates a cross-sectional view of the inner crown 162 taken along line 16-16 in FIG. 16A. The inner crown 162 can generally define the V-shaped cross-section, as shown. The inner crown 162 can comprise the substantially annular inner crown body 505 and the inner teeth 164, as previously described. The ramp 166 formed monolithically with the inner crown 162 can extend from the inner crown body 505, opposite the inner teeth 164, and can be angled radially inward therefrom. An acute angle $\theta$ can be defined between the ramp 166 and the inner crown body 505. The ramp 166 can define the angled ramp surface 168, which can be the same as the angled inner crown side surface 1220 in the present aspect. Additionally, as shown in FIGS. 16A and 16B, the inner crown 162 can define one or more pin holes 1610 formed through the inner crown body 505. Each of the sliding guide pins 1420 (shown in FIG. 14) can extend through a corresponding one of the pin holes 1610 and can slidably engage a corresponding one of the axial guide channels 1510 (shown in FIG. 15) to rotationally fix the inner crown 162 relative to the fitting body 110 (shown in FIG. 1). Additionally, the inner crown 162 can define one or more ramp holes 1620 formed through the ramp 166. Each of the ramp holes 1620 can be substantially aligned with a corresponding one of the pin holes 1610 to allow insertion of the sliding guide pins 1420 into each pin hole 1610 during assembly.

Figure 17:
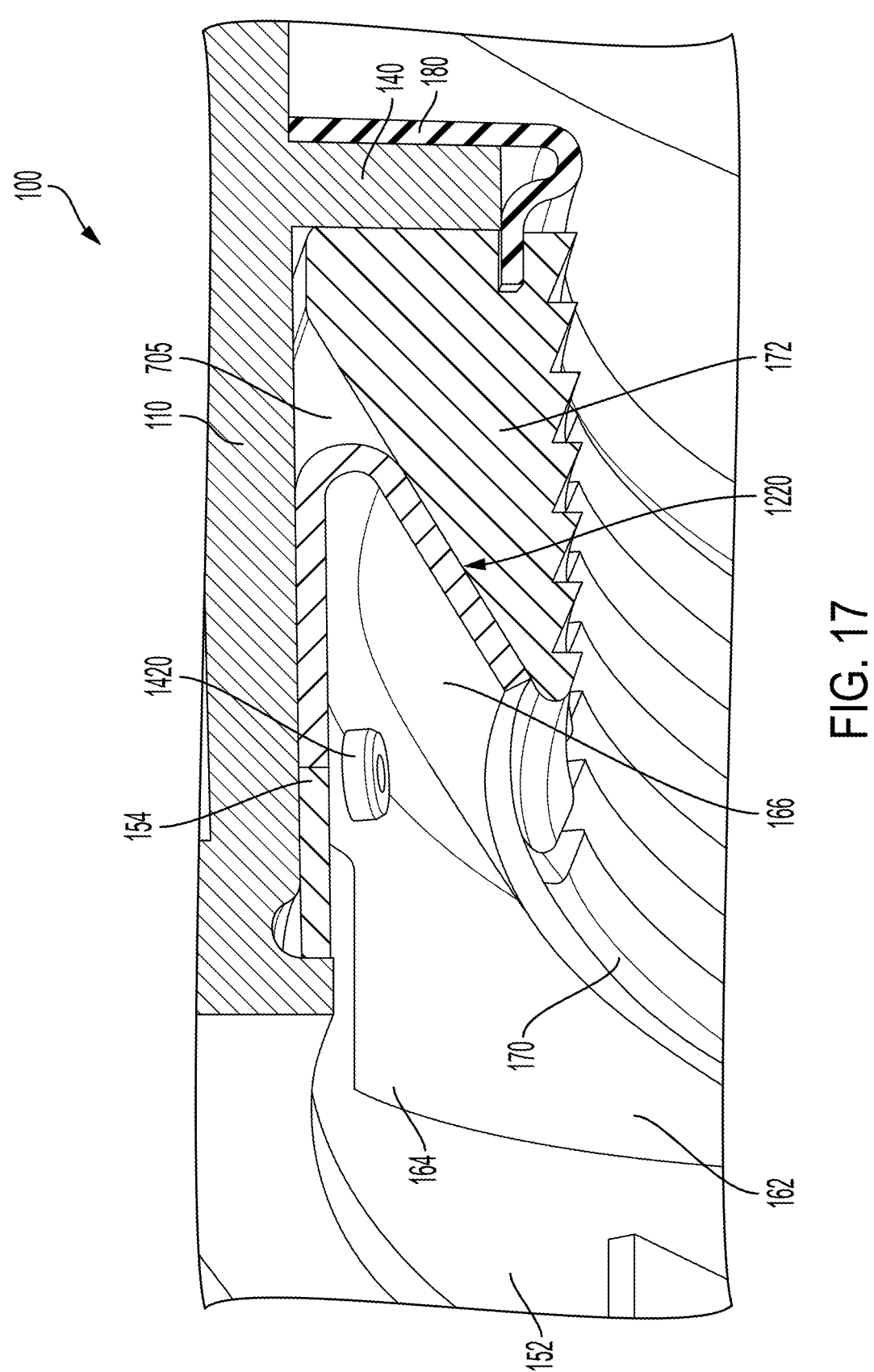
FIG. 17 is a detail cross-sectional view of the pipe fitting of FIG. 14, taken along a line similar to 9-9 in FIG. 1.

FIG. 17 illustrates a detail cross-sectional view of the pipe fitting 100 of FIG. 14, illustrating the engagement of the inner teeth 164 of the inner crown 162 with the outer teeth 154 of the outer crown 152 and the engagement of the ramp 166 of the inner crown 162 with the gripper pads 172 of the grip ring 170.

Figure 18:
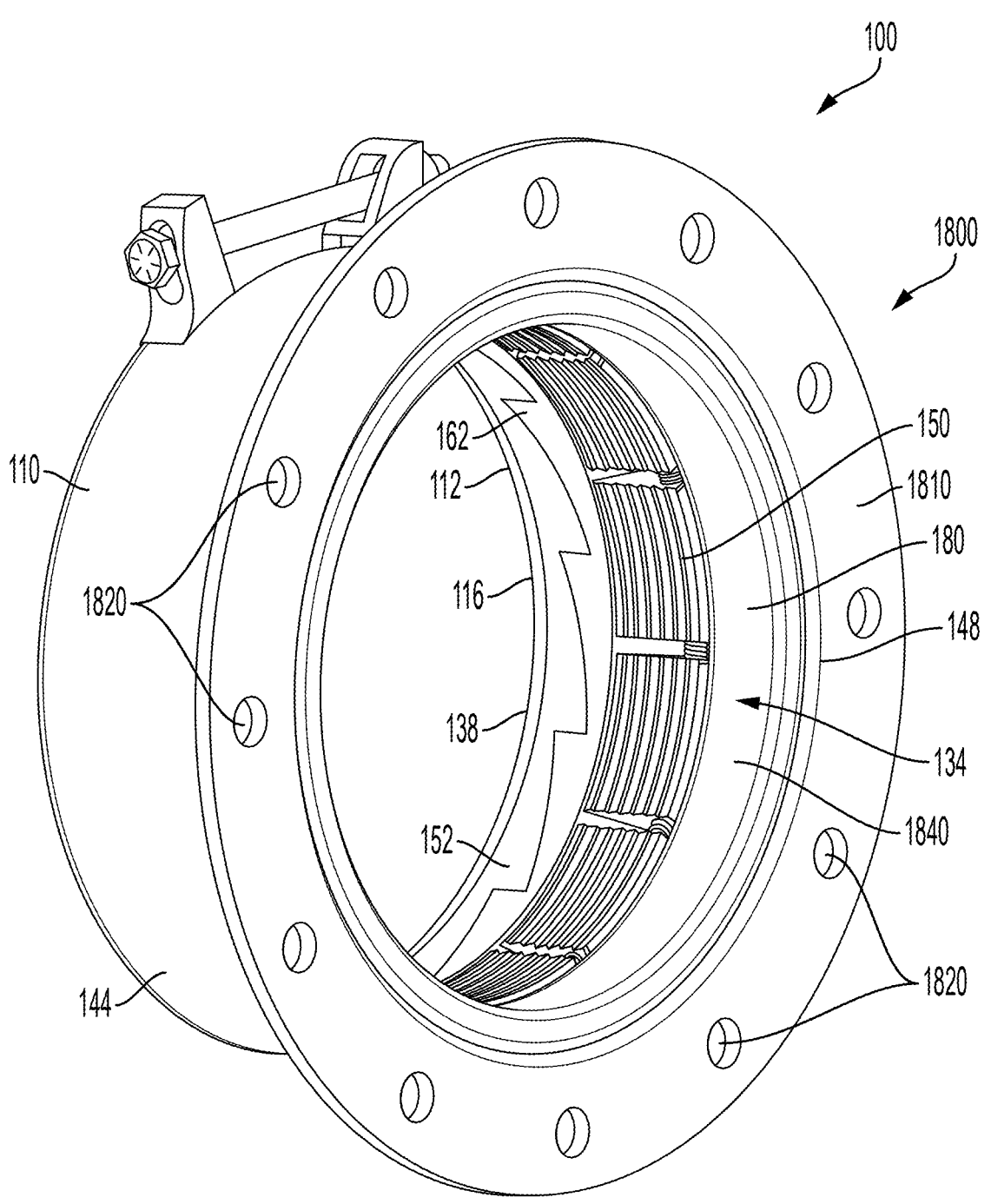
FIG. 18 is a perspective view of a pipe fitting in accordance with another aspect of the current disclosure.

FIG. 18 shows another aspect of a pipe fitting 100. In the aspect of FIG. 18, the pipe fitting 100 can comprise a half-portion 1800 comprising a flange 1810 defining a series of fastener holes 1820 circumferentially around the flange 1810. The half-portion 1800 can be that portion of the pipe fitting 100 extending from the first end 116 to the midpoint 148, and can comprise the first gripping assembly 150 and the gasket 180 enclosed within the fitting body 110. In the current aspects, the gasket 180 can also function as a spacer 1840. In the current aspect, the half-portion 1800 can be assembled by insertion of the first gripping assembly 150 and then the spacer 1840 into the fitting bore 134 at the midpoint 148, which makes assembly of the pipe fitting 100 easier. The half-portion 1800 can then be attached by fasteners such as nuts and bolts through the fastener holes 1820 of the flange 1810 to a similar and/or identical half-portion 1810 having a similar flange 1810 to create a fully assembled pipe fitting 100 defining the first fitting end 116 and the second fitting end 118 with two gripping assemblies 150,950 and thereby capable of connecting a pair of pipe segments, similar to previous aspects. In other aspects, the half-portion 1800 can be attached to a flange on a different pipe element, such as a valve or a flanged pipe, thereby allowing the different pipe element to be attached to a plain-end pipe or other pipe segment using the half-portion 1800 mounted to the different pipe element.

Figure 19:
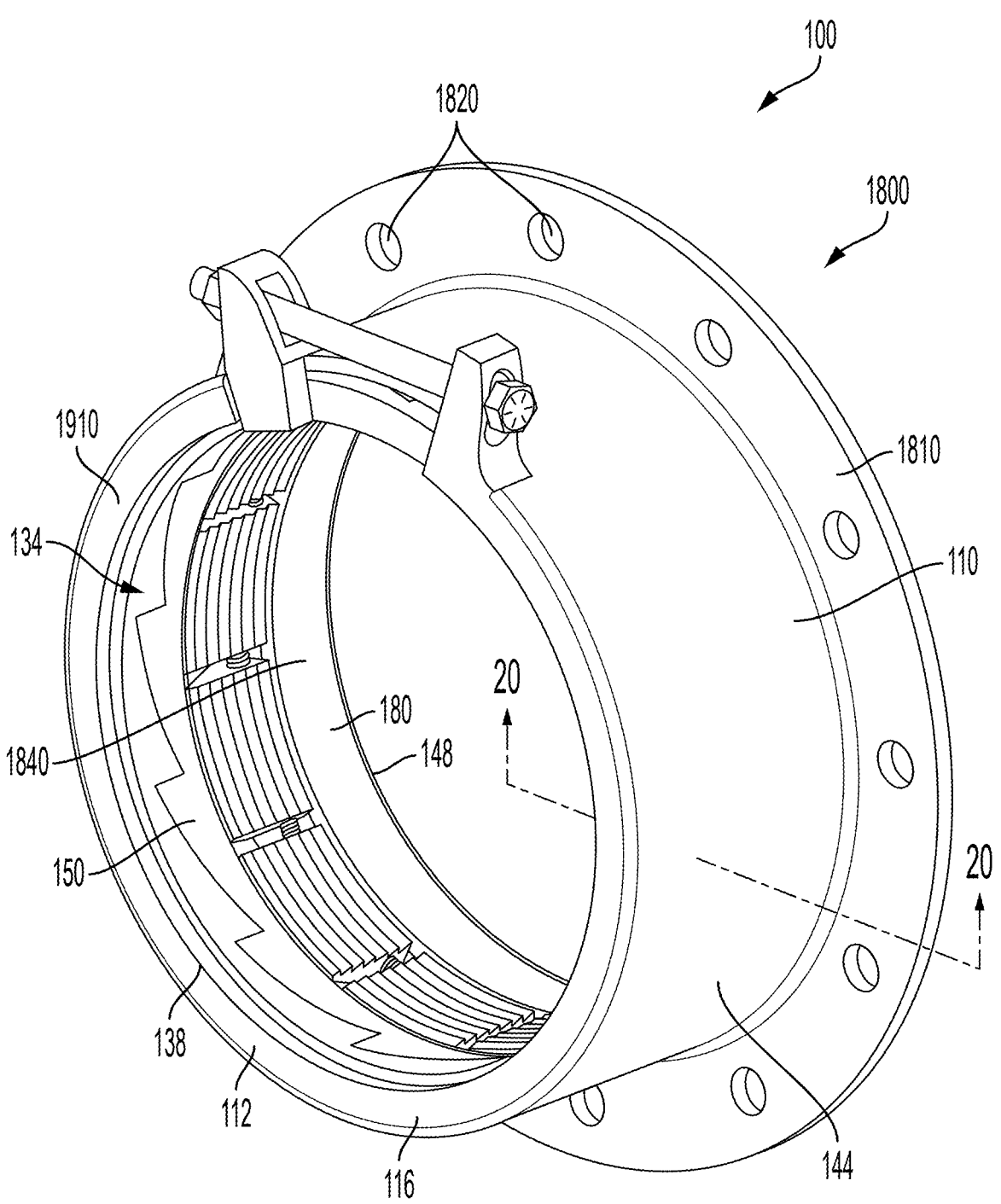
FIG. 19 is another perspective view of the pipe fitting of FIG. 18.

FIG. 19 shows another perspective view of the half-portion 1800 of FIG. 18. As shown in FIG. 19, the retention cap 112 can be formed as a monolithic element of the fitting body 110, and can be defined as a retention flange 1910 extending inward from the fitting body 110 at the first end 116. Forming the retention flange 1910 as monolithic with the fitting body 110 strengthens the retention ability of the pipe fitting 100 to retain the gripping assembly 150 within the fitting body 110 during use and when under pressure, and forming the pipe fitting 100 as a half-portion 1800 allows for the retention flange 1910 to be formed monolithically with the fitting body 110 because the first gripping assembly 150 to be inserted from the midpoint 148 prior to attachment of the flange 1810 to another half-portion 1800 or a different pipe element.

Figure 20:
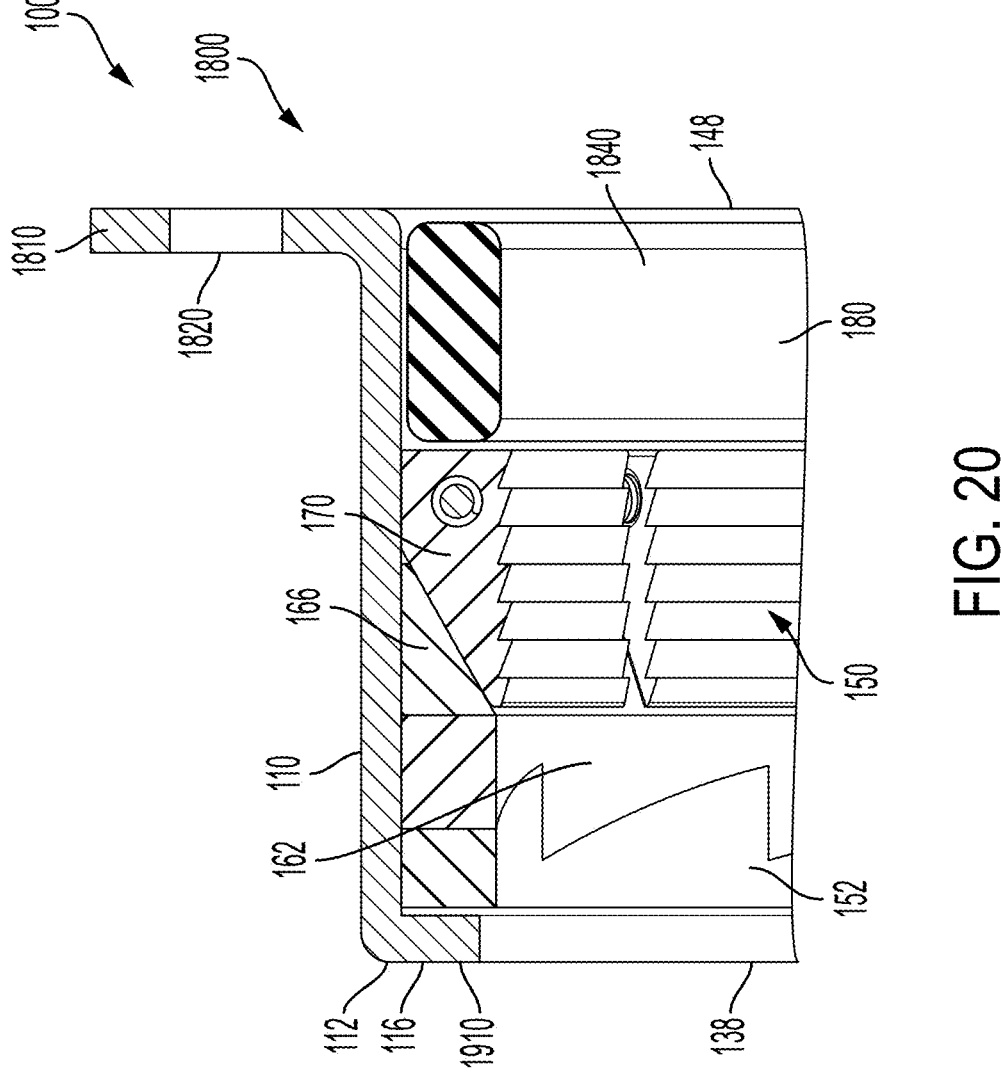
FIG. 20 is a cross-sectional view of a portion of the pipe fitting of FIG. 18 taken along line 20-20 in FIG. 19.

FIG. 20 shows a cross-sectional view of the half-portion 1800 of FIG. 18. As shown in FIG. 20, the spacer 140 can be positioned between the midpoint 148 and the gripping assembly 150. Further, as shown in FIG. 20, the gripping assembly 150 can comprise the ramp 166 to engage the inner crown 162 during tightening of the pipe fitting 100 and thereby push the grip ring 170 radially inward again the pipe segment as the grip ring 170 is blocked from axial movement by the spacer 1840 after attachment of the half-portion 1800 to another half-portion 1800 or a different pipe element. When attached to a different pipe element, the different pipe element can comprise a stop feature, such as an inner flange or another spacer, at an end of the different pipe element that engages the midpoint 148, and the stop feature can prevent axial movement of the spacer 1840 so that the spacer can prevent axial movement of the grip ring 170.

Figure 21:
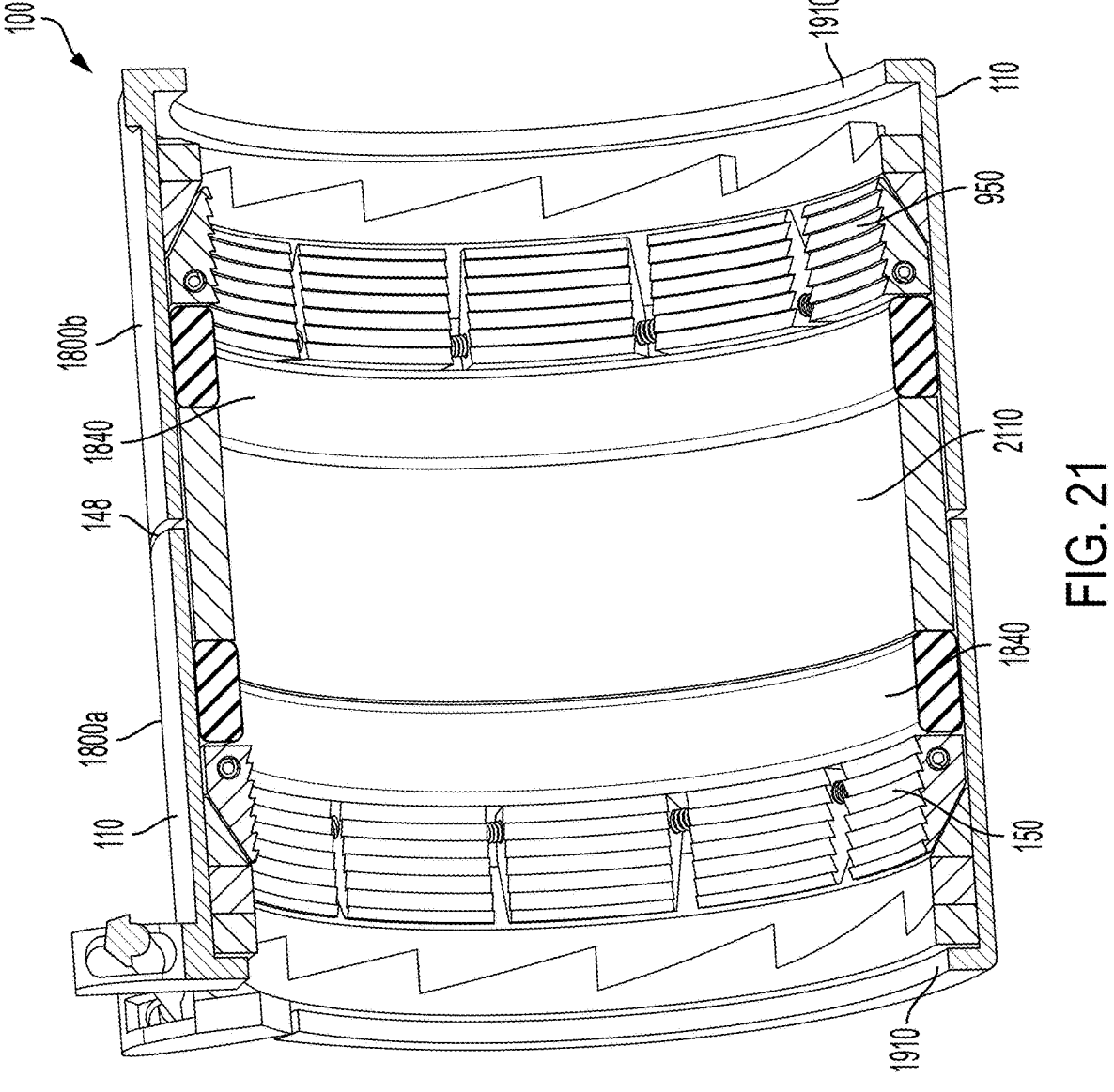
FIG. 21 is a cross-sectional view of a pipe fitting in accordance with another aspect of the current disclosure.

FIG. 21 shows a cross-sectional view of another aspect of a pipe fitting 100. As shown in FIG. 21, the pipe fitting 100 can comprise a pair of half-portions 1800a,b attached at midpoint 148. In the current aspect, the half-portions 1800a,b can be attached to each other by a weld at midpoint 148. The gripping assemblies 150,950 can thereby be assembled into each fitting body 110 of each half-portion 1800a,b prior to the half-portions 1800 being joined together, allowing for ease of assembly, such as when the retention flange 1910 is formed monolithically with the fitting body 110 of each half-portion 1800. In addition, as shown, the pipe fitting 110 can comprise an insert 2110 between spacers 1840a,b. Spacers 1840 may comprise a material, such as rubber, that may melt or otherwise be damaged during the welding process, and an insert 2110 comprising a material such as metal can be present to hold the spacers 1840a,b away from the weld and against each gripping assembly 150,950, respectively. In some aspects, the insert 2110 can be welded along with the half-portions 1800 at the midpoint 148. In other aspects, the insert 2110 can be designed to fit tightly within the pipe fitting 100, or can include boss ring that aligns with the midpoint 148 between the half-portions 1800a,b. In other aspects, such as when the spacers 1840 comprise a material that would not be damaged by the welding, the two spacers 1840a,b can be sized similar to the spacer 1840 shown in FIG. 18 such that the spacers 1840a,b contact each other at midpoint 148. In other aspects, the spacer 1840 can be sized such that a single spacer 1840 extends axially to contact each gripping assembly 150,950, allowing for a single spacer 1840 to be used in other aspects in which two half-portions 1800 are joined together.

In other aspects, the pipe fittings 100 of FIGS. 18-21 defining half-portions 1800 can comprise any of the previously described gripping assemblies 150,950, gaskets 180, and/or retention caps 112, and the fitting body 110 of each half-portion 1800 can define any of the previously described structural features to engage the gripping assemblies 150, 950, retention caps 112, and/or gaskets 180 as previously described.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A gripping assembly for a pipe fitting comprising:
a fitting body defining a first fitting end, a second fitting end opposite the first fitting end, and a fitting bore extending from the first fitting end to the second fitting end, the fitting bore defining a fitting axis and at least one axial guide rib;
a substantially annular ramp defining a ramp void therethrough, the substantially annular ramp further defining an angled ramp surface angled radially inward relative to the ramp void; and
a substantially annular grip ring defining a ring void therethrough, the substantially annular grip ring further defining an inward gripper surface and an angled ring surface, the angled ring surface extending radially inward relative to ring void and contacting and slidable along the angled ramp surface of the substantially annular ramp;
wherein the ramp void and the ring void are configured to receive a pipe end of a pipe therethrough, the substantially annular ramp is configured to bias the substantially annular grip ring radially inward towards the pipe, and the inward gripper surface is configured to grip an outer pipe surface of the pipe; and wherein one of the substantially annular ramp and the substantially annular grip ring defines at least one axial groove, each axial groove configured to slidably receive a corresponding axial guide rib therein.

2. The gripping assembly of claim 1, wherein the inward gripper surface defines a plurality of gripping ridges extending radially into the ring void, each of the plurality of gripping ridges defining a radially inward edge configured to grip the outer pipe surface of the pipe.

3. The gripping assembly of claim 2, wherein the substantially annular grip ring comprises a plurality of gripper pads spaced circumferentially about the substantially annular grip ring, each of the plurality of gripper pads comprising at least one gripping ridge of the plurality of gripping ridges.

4. The gripping assembly of claim 3, wherein each of the gripper pads is connected to an adjacent gripper pad by a gripper spring, wherein the gripper springs allow an inner diameter of the substantially annular grip ring to contract when the substantially annular grip ring is biased radially inward towards the pipe by the substantially annular ramp.

5. The gripping assembly of claim 3, wherein:

each of the gripper pads defines an outward gripper surface opposite the inward gripper surface; and each of the gripper pads defines a substantially planar, gripper side surface extending radially between the outward gripper surface and the inward gripper surface, opposite the angled ring surface of the substantially annular grip ring.

6. The gripping assembly of claim 2, wherein each of the plurality of gripping ridges defines a substantially triangular cross-section.

7. The gripping assembly of claim 6, wherein:

the substantially annular grip ring defines a first axial gripper side and a second axial gripper side opposite the first axial gripper side; and each of the plurality of gripping ridges defines an elongated, angled leading surface generally facing toward the first axial gripper side and a shortened, trailing surface generally facing towards the second axial gripper side.

8. The gripping assembly of claim 1, wherein the substantially annular grip ring defines an outward gripper surface opposite the inward gripper surface, and wherein the outward gripper surface is substantially parallel with the ring void.

9. A gripping assembly for a pipe fitting comprising:

an outer crown comprising a plurality of outer teeth;

an inner crown comprising a plurality of inner teeth nested with the plurality of outer teeth;

a ramp defining an angled ramp surface; and a grip ring defining an angled ring surface;

wherein:

the gripping assembly defines a gripping axis extending centrally through the outer crown, the inner crown, the ramp, and the grip ring;

the outer crown is configured to rotate the outer teeth against the inner teeth to bias the inner crown axially against one of the ramp or the grip ring; and the angled ring surface of the grip ring is configured to slide along the angled ramp surface of the ramp to bias the grip ring radially inward relative to the gripping axis.

10. The gripping assembly of claim 9, wherein:

the inner crown is arranged axially between the outer crown and the ramp;

the ramp is arranged axially between the inner crown and the grip ring; and the inner crown is configured to axially bias the ramp against the grip ring.

11. The gripping assembly of claim 10, wherein:

the inner crown defines an outward inner crown surface;

the outward inner crown surface defines an axial crown groove;

the ramp defines an outward ramp surface; and the outward ramp surface defines an axial ramp groove aligned with the axial crown groove.

12. The gripping assembly of claim 11, wherein the grip ring defines an outward gripper surface, and wherein the outward gripper surface defines an axial pad groove aligned with the axial ramp groove and the axial crown groove.

13. The gripping assembly of claim 11, wherein the inner crown defines an inner crown body and the inner teeth extending axially from the inner crown body, and wherein the axial crown groove formed in the outward inner crown surface extends axially across each of the inner crown body and at least one of the inner teeth.

14. The gripping assembly of claim 10, wherein the inner crown defines a substantially planar inner crown side surface opposite the inner teeth, and wherein the ramp defines a substantially planar ramp side surface confronting the substantially planar inner crown side surface.

15. The gripping assembly of claim 9, wherein each of the inner teeth and the outer teeth are substantially triangular in shape and extend in a substantially axial direction.

16. The gripping assembly of claim 9, wherein the grip ring further defines a ring void and an inward gripper surface;

the inward gripper surface defines a plurality of gripping ridges extending radially into the ring void; and each of the plurality of gripping ridges defines a radially inward edge configured to grip an outer pipe surface of a pipe.

17. The gripping assembly of claim 16, wherein:

the grip ring comprises a plurality of gripper pads spaced circumferentially about the grip ring;

each of the gripper pads is connected to an adjacent gripper pad by a gripper spring; and the gripper springs allow an inner diameter of the grip ring to contract when the grip ring is biased radially inward by the ramp.

18. The gripping assembly of claim 16, wherein each of the plurality of gripping ridges defines a substantially triangular cross-section and is curved to accommodate a curvature of the pipe.

19. The gripping assembly of claim 18, wherein:

the grip ring defines a first axial gripper side and a second axial gripper side opposite the first axial gripper side; and each of the plurality of gripping ridges defines an elongated, angled leading surface generally facing toward the first axial gripper side and a shortened, trailing surface generally facing towards the second axial gripper side.

20. A pipe fitting comprising:

a fitting body defining a first fitting end, a second fitting end opposite the first fitting end, and a fitting bore extending from the first fitting end to the second fitting end, the fitting bore defining a fitting axis and at least one axial guide rib; and a gripping assembly arranged at least partially within the fitting bore, the gripping assembly comprising:

a ramp defining an angled ramp surface; and a grip ring defining an angled ring surface, wherein the angled ring surface of the grip ring is configured to slide along the angled ramp surface of the ramp to bias the grip ring radially inward relative to the fitting axis;

wherein one of the ramp and the grip ring defines at least one axial groove, each axial groove configured to slidably receive a corresponding axial guide rib therein.

21. The pipe fitting of claim 20, wherein the fitting body defines a first half-portion and a second half-portion joined together at a midpoint.

* * * * *